(12) United States Patent
Kim

(10) Patent No.: US 11,630,046 B2
(45) Date of Patent: Apr. 18, 2023

(54) DEVICE FOR MEASURING RHEOLOGICAL PROPERTIES OF HIGH-VISCOSITY MATERIAL AND MEASUREMENT METHOD THEREFOR

(71) Applicant: Myoung Ho Kim, Daejeon (KR)

(72) Inventor: Myoung Ho Kim, Daejeon (KR)

( * ) Notice: Subject to any disclaimer, the term of this patent is extended or adjusted under 35 U.S.C. 154(b) by 0 days.

(21) Appl. No.: 17/610,431

(22) PCT Filed: Jul. 9, 2020

(86) PCT No.: PCT/KR2020/008990
§ 371 (c)(1),
(2) Date: Nov. 10, 2021

(87) PCT Pub. No.: WO2021/006653
PCT Pub. Date: Jan. 14, 2021

(65) Prior Publication Data
US 2022/0205891 A1 Jun. 30, 2022

(30) Foreign Application Priority Data
Jul. 11, 2019 (KR) .......... 10-2019-0084110

(51) Int. Cl.
*G01N 11/14* (2006.01)
*G01N 11/06* (2006.01)
*G01N 11/08* (2006.01)

(52) U.S. Cl.
CPC ............. *G01N 11/14* (2013.01); *G01N 11/06* (2013.01); *G01N 11/08* (2013.01)

(58) Field of Classification Search
CPC .............. G01N 11/14; G01N 11/00; G01N 2011/0026; G01N 2011/0046; G01N 11/04; G01N 11/162; G01N 11/165
See application file for complete search history.

(56) References Cited

U.S. PATENT DOCUMENTS 1,810,992 A * 6/1931 Von Dallwitz-Wegner ................
G01N 11/08
73/54.04
2,873,584 A * 2/1959 Claudy .................. G01N 11/14
439/5
(Continued)

FOREIGN PATENT DOCUMENTS

EP 2063249 A2 * 5/2009 ............. G01N 11/14
JP 05-052736 A 3/1993
(Continued)

OTHER PUBLICATIONS

ESPACENET Machine Translation of KR 20090041672 A Which Originally Published on Apr. 29, 2009. (Year: 2009).*
(Continued)

*Primary Examiner* — David A. Rogers
(74) *Attorney, Agent, or Firm* — Revolution IP, PLLC

(57) ABSTRACT

The present invention relates to a device for measuring rheological properties of a high-viscosity material and a measurement method thereof in which, while a discharger of the present invention is completely blocked, a change in pressure of the high-viscosity material due to a change in the number of rotations of a first screw is measured, thus having an advantage of being able to precisely and reproducibly measure the viscosity.

5 Claims, 17 Drawing Sheets

(56) References Cited

U.S. PATENT DOCUMENTS

| | | | | |
|---|---|---|---|---|
| 2,953,682 A * | 9/1960 | Frank | ............ | G01N 11/00 250/363.01 |
| 2,992,651 A * | 7/1961 | Milos | ............ | G01N 11/14 73/54.33 |
| 3,053,079 A * | 9/1962 | Miller | ............ | G01N 11/14 73/54.31 |
| 3,128,620 A * | 4/1964 | Gupta | ............ | G01N 11/14 73/54.35 |
| 3,229,506 A * | 1/1966 | Bruss | ............ | G01N 11/08 73/54.32 |
| 3,764,114 A * | 10/1973 | Ocker | ............ | B29C 48/2564 366/301 |
| 3,841,147 A * | 10/1974 | Coil | ............ | B29C 48/92 702/50 |
| 3,856,278 A * | 12/1974 | Eisenmann | ............ | B29C 48/92 366/84 |
| 3,999,045 A * | 12/1976 | Schwartz | ............ | G01B 15/02 702/170 |
| 4,449,395 A * | 5/1984 | Kurtz | ............ | G01N 11/04 73/54.11 |
| 4,472,063 A * | 9/1984 | Eickelmann | ............ | B01F 27/114 366/310 |
| 4,541,270 A | 9/1985 | Hanslik | | |
| 4,786,181 A * | 11/1988 | O'Brien | ............ | B29C 48/66 366/89 |
| 4,878,378 A * | 11/1989 | Harada | ............ | G01N 11/14 73/54.35 |
| 5,078,007 A * | 1/1992 | Tadros | ............ | G01N 33/442 73/54.14 |
| 5,209,108 A | 5/1993 | Shackelford | | |
| 5,277,058 A * | 1/1994 | Kalyon | ............ | G01N 33/442 73/54.14 |
| 5,317,908 A * | 6/1994 | Fitzgerald | ............ | G01N 11/162 73/54.25 |
| 5,597,235 A * | 1/1997 | Barnes | ............ | B29C 48/92 366/76.6 |
| 5,708,197 A | 1/1998 | Todd et al. | | |
| 6,874,353 B2 * | 4/2005 | Johnson | ............ | G01N 11/14 73/54.38 |
| 7,083,321 B2 * | 8/2006 | Grunschloss | ............ | B29C 48/56 366/80 |
| 7,392,842 B2 * | 7/2008 | Morgan | ............ | G01N 11/14 166/250.1 |
| 7,594,807 B2 * | 9/2009 | Yamazaki | ............ | B29C 48/11 425/197 |
| 7,712,526 B2 * | 5/2010 | Morgan | ............ | G01N 11/14 166/250.1 |
| 7,992,427 B2 * | 8/2011 | Tonmukayakul | ............ | G01N 11/14 73/54.38 |
| 8,794,051 B2 * | 8/2014 | Morgan | ............ | G01N 11/14 73/54.23 |
| 9,291,585 B2 * | 3/2016 | Singh | ............ | G01N 33/2823 |
| 9,612,184 B2 * | 4/2017 | Ozadali | ............ | B01F 27/0724 |
| 9,702,799 B2 * | 7/2017 | Gaugler | ............ | G01N 33/383 |
| 9,702,800 B2 * | 7/2017 | Morgan | ............ | G01N 11/14 |
| 9,726,589 B2 * | 8/2017 | Zamora | ............ | G01N 11/14 |
| 9,777,542 B2 * | 10/2017 | Stock | ............ | G01N 11/10 |
| 9,958,367 B2 * | 5/2018 | Sangwai | ............ | G01N 11/14 |
| 10,697,876 B1 * | 6/2020 | Jamison | ............ | G01N 11/14 |
| 11,241,026 B2 * | 2/2022 | Wenger | ............ | B01F 35/95 |
| 2007/0248454 A1 * | 10/2007 | Davis | ............ | F04D 5/001 415/74 |
| 2008/0047327 A1 * | 2/2008 | Uphus | ............ | G01N 11/14 73/54.11 |
| 2008/0105040 A1 * | 5/2008 | Bivens | ............ | G01N 11/14 73/54.28 |
| 2009/0133478 A1 * | 5/2009 | Sentmanat | ............ | G01N 11/14 73/54.28 |
| 2009/0178471 A1 * | 7/2009 | Uphus | ............ | G01N 11/14 73/54.11 |
| 2013/0219983 A1 * | 8/2013 | George | ............ | G01N 11/08 73/1.03 |

FOREIGN PATENT DOCUMENTS

| | | |
|---|---|---|
| JP | 2001-516444 A | 9/2001 |
| KR | 10-2009-0041672 A | 4/2009 |
| KR | 10-1233280 B1 | 2/2013 |
| KR | 10-1336156 B1 | 12/2013 |

OTHER PUBLICATIONS

ESPACENET Machine Translation of JP H 0552736 A Which Originally Published on Mar. 2, 1993. (Year: 1993).*

International Search Report for PCT/KR2020/008990 dated Sep. 4, 2020 from Korean Intellectual Property Office.

* cited by examiner

DEVICE FOR MEASURING RHEOLOGICAL PROPERTIES OF HIGH-VISCOSITY MATERIAL AND MEASUREMENT METHOD THEREFOR

TECHNICAL FIELD

The present invention relates to a device for measuring rheological properties of a material, and more particularly, to a device for measuring rheological properties of a high-viscosity material and a measurement method thereof.

BACKGROUND ART

Generally, fluids are widely used as intermediate materials or final products formed in a fluid form across all industries including paint, adhesive, cosmetic, food, and petrochemical industries.

The property of fluids resisting a tendency to flow refers to viscosity, and the level of viscosity is referred to as viscosity or a coefficient of viscosity. In particular, when viscosity changes depending on the shear rate, it is referred to as a viscosity function.

Among methods of measuring the viscosity of fluids, as single viscosity measurement methods, a Brookfield viscometer, an Oswald viscometer, a Falling ball viscometer, and the like are widely used in measuring viscosity or the coefficient of viscosity.

Such measurement methods have a characteristic of measuring viscosity at room temperature or at low temperatures lower than or equal to 60° C.

Meanwhile, for materials with a high molecular weight such as a polymer melt or a rubber melt, measurement is performed at high temperatures higher than or equal to a glass transition temperature (Tg) or a melting transition temperature (Tm), and since a change in the shear rate is accompanied by a change in the internal structure and thus phenomena such as shear thinning or shear thickening occurs, making it difficult to perform measurement, only limited methods are used to measure the viscosity function.

Further, for viscosity measurement methods such as a rotational type and a capillary type, standard measurement methods are listed in the International Organization for Standardization (ISO) or the American Society for Testing and Materials (ASTM) and are widely used for measuring the viscosity function of rubber and polymer melts.

However, such methods of measuring the viscosity of rubber and polymer melts have a disadvantage in that, due to the measurement being performed at high temperatures, material degeneration accompanies according to a retention time in a measurer, or due to an increase in the shear rate, shear heating severely occurs and measurement reproducibility significantly decreases.

As related art for addressing the above problems, in "RHEOLOGICAL TEST APPARATUS AND METHOD USING A HELICAL SCREW RHEOMETER" of U.S. Pat. No. 5,209,108 (hereinafter referred to as "Document 1"), there is disclosed an apparatus that, in response to pressure differences and speeds of fluid flowing into the rheometer, calculates parameters of a shear rate versus shear stress relationship of the fluid and uses the parameters, thus enhancing a rheological test.

When using the invention of Document 1, there is an advantage in that, by real-time monitoring of differential pressures relating to various lengths and diameters of a fluid flow on the basis of the shear rate versus shear stress relationship of the fluid, it is possible to observe flow properties of the fluid in real time.

However, the invention of Document 1 is a rheological test apparatus used when determining characteristics of fluid and has a disadvantage of not being able to directly calculate the viscosity or viscosity function of the fluid as a precise value.

As another related art, in "HELICAL BARREL RHEOMETER" of U.S. Pat. No. 5,708,197 (hereinafter referred to as "Document 2"), there is disclosed a helical barrel rheometer capable of measuring the temperature, pressure, and shear rate of fluid.

When using the invention of Document 2, despite having an advantage of easy statistical process control and quality control by measuring the temperature, pressure, and shear rate of the fluid in various ranges, there is a disadvantage in that, due to an insufficient barrel length, a separate device is required to put a melt of a sample into a measurer, or for the barrel to have a characteristic of being deployed, measurement cannot be performed under high pressure.

As another related art, in "APPARATUS AND METHOD OF MEASURING VISCOSITY OF CONTINUOUS RUBBER" of "Korean Unexamined Patent Application Publication No 10-2009-0041672 (hereinafter referred to as "Document 3"), there is disclosed a continuous-type viscosity function measurement apparatus that is formed to measure the viscosity of a sample collected from a continuously-moved rubber compound and give feedback thereto using a mixer, thus being able to control the viscosity of continuous rubber in real time, and that uses a separate slit-type viscosity calculation apparatus at a downstream portion of an extruder.

When using the invention of Document 3, despite having an advantage of being able to control a mixing ratio of a rubber compound in real time by calculating viscosity using the pressure and weight of sample rubber, there is a disadvantage in that, due to being formed to calculate the viscosity by measuring the pressure at an end of a barrel of the extruder just as the rubber included in the barrel of the extruder is penetrated, according to an increase in the rotational speed of the extruder to increase the shear rate, the temperature of a measuring object also increases due to a viscous heating effect, thus making it difficult to measure a viscosity value at the same melt temperature.

As another related art, in "CAPILLARY TYPE DIGITAL VISCOMETER" of Korean Patent Registration No. 10-1233280 (hereinafter referred to as "Document 4"), there is disclosed a viscometer that includes a temperature correction function and is capable of calculating an absolute viscosity at a standard temperature without being affected by a measurement temperature.

When using the invention of Document 4, despite having an advantage of being able to measure the viscosity without being affected by the measurement temperature, there is an inconvenience that, when measuring a high-viscosity fluid, viscosity measurement should be performed after lowering the viscosity using a solvent.

RELATED ART DOCUMENTS

U.S. Pat. No. 5,209,108
U.S. Pat. No. 5,708,197
Korean Unexamined Patent Application Publication No 10-2009-0041672

Korean Patent Registration No. 10-1233280

DISCLOSURE

Technical Problem

The present invention is directed to providing a device for measuring rheological properties of a high-viscosity material including any one selected from viscosity, a viscosity function, and viscoelasticity thereof that is capable of measuring a change in pressure of the high-viscosity material in the measurement device, thus being able to precisely and reproducibly measure viscosity.

Further, the present invention is directed to providing a device for measuring rheological properties of a high-viscosity material that is capable of calculating the rheological properties of the high-viscosity material using a third measurer formed at an end of a first screw.

In addition, the present invention is directed to providing a device for measuring rheological properties of a high-viscosity material that is capable of measuring the rheological properties of a single material at various temperatures at one time.

Technical Solution

The present invention provides a device for measuring rheological properties of a high-viscosity material, the device including: a first measurer (100) which includes one or more first screws (140) therein; a second transmitter (200) which is formed to interwork with the first measurer (100), formed to interwork with any one selected from the first measurer (100) and a first controller (300), and configured to measure a measurement value of a material included in the first measurer (100); the first controller (300) which is formed to interwork with the first measurer (100) and configured to control rotation of the first screw (140); and a second controller (400) which is formed to interwork with any one selected from the first measurer (100), the second transmitter (200), and the first controller (300) to control the same.

Also, the first measurer (100) may include: a discharger (110) which is formed to facilitate measurement of physical properties of the high-viscosity material in the first measurer (100) and discharge of the high-viscosity material to the outside; a temperature maintainer (120) which is formed on any one selected from the outside and inside of the first measurer (100) to maintain the temperature inside the first measurer (100) to be constant; a first inlet (130) which is formed to have one open side to allow the material to be measured to enter the first measurer (100); and the first screw (140) which is inserted into the first measurer (100) to easily push the material included in the first measurer (100) toward the discharger (110) and to, simultaneously, protrude outward to control the temperature of the material according to the rotational speed and which includes one or more first blade portions (141) formed to surround an outer peripheral surface.

Further, the second transmitter (200) may include a second measurer (210) formed to interwork with the first measurer (100).

Also, the high-viscosity material included in the first measurer (100) may have a viscosity of 50 cP or higher at a temperature at which the measurement is to be performed.

Further, Z, which is the length of an interval between the first blade portions (141), may be formed to be a length that is less than or equal to $3D_B$ based on $D_B$ which is an inner diameter of the first measurer (100).

Also, the second measurer (210) may be formed to have a size that is larger than or equal to the interval between the first blade portions (141) formed to protrude outward along the outer diameter of the first screw (140).

Further, the first measurer (100) may include one or more third blade portions (146) which are formed to protrude outward from an end of any one selected from one side and the other side of the first screw (140) so as not to interfere with the first blade portion (141) and which are formed to surround the outer diameter of the first screw (140).

Also, the first measurer (100) may include any one selected from a fourth screw (147-1), which is formed to have an outer diameter gradually decreasing toward the end and includes a fourth blade portion (148) formed to protrude outward to surround the outer diameter, and a fifth screw (147-2), which is formed to have an outer diameter gradually increasing toward the end and includes the first blade portion (141) formed to protrude outward to surround the outer diameter.

Further, the first measurer (100) may further include a third measurer (149) formed to protrude in a longitudinal direction from an end of the first screw (140).

The present invention provides a measurement method of a device for measuring rheological properties of a high-viscosity material, the measurement method including: a first step (S110) of causing a material, whose physical properties are to be measured, to enter a first inlet (130) included in a first measurer (100) so that the material is accommodated in the first measurer (100) in a state in which the discharger (110) is open and then operating a first controller (300) by any one selected from a second controller (400) and a sixth device (600) to pass the material through the discharger (110) and purge the material; a second step (S120) of, after the first step (S110) is performed, closing the discharger (110) of the first measurer (100) to make a flow rate at an end reach 0; a third step (S130) of, after the second step (S120) is performed, operating the first controller (300) by the second controller (400) to rotate a first screw (140) and move the material, whose physical properties are to be measured, toward the discharger (110) and, simultaneously, performing any one selected from melting, degassing, kneading, and softening; a fourth step (S140) of, after the third step (S130) is performed, changing the rotational speed of the first screw (140) to measure a change in pressure of the material, whose physical properties are to be measured, by the second measurer (210) and observe the physical properties; and a fifth step (S150) of, after the fourth step (S140) is performed, opening the discharger (110) to discharge the material, whose physical properties are to be measured, to the outside.

Advantageous Effects

According to the present invention, by measuring a change in pressure of a high-viscosity material, there are advantages of being able to precisely and reproducibly measure the viscosity and being able to calculate rheological properties of the high-viscosity material including any one selected from viscosity, a viscosity function, and viscoelasticity thereof using a third measurer formed at an end of a first screw in a device for measuring rheological properties of a high-viscosity material.

Also, there is an advantage of being able to measure rheological properties at various temperatures at one time through a single experiment.

Further, there is an advantage in that the length of the first screw enables size reduction of the device for measuring rheological properties of a high-viscosity material according to the present invention.

DESCRIPTION OF REFERENCE NUMERALS

Figure 1:
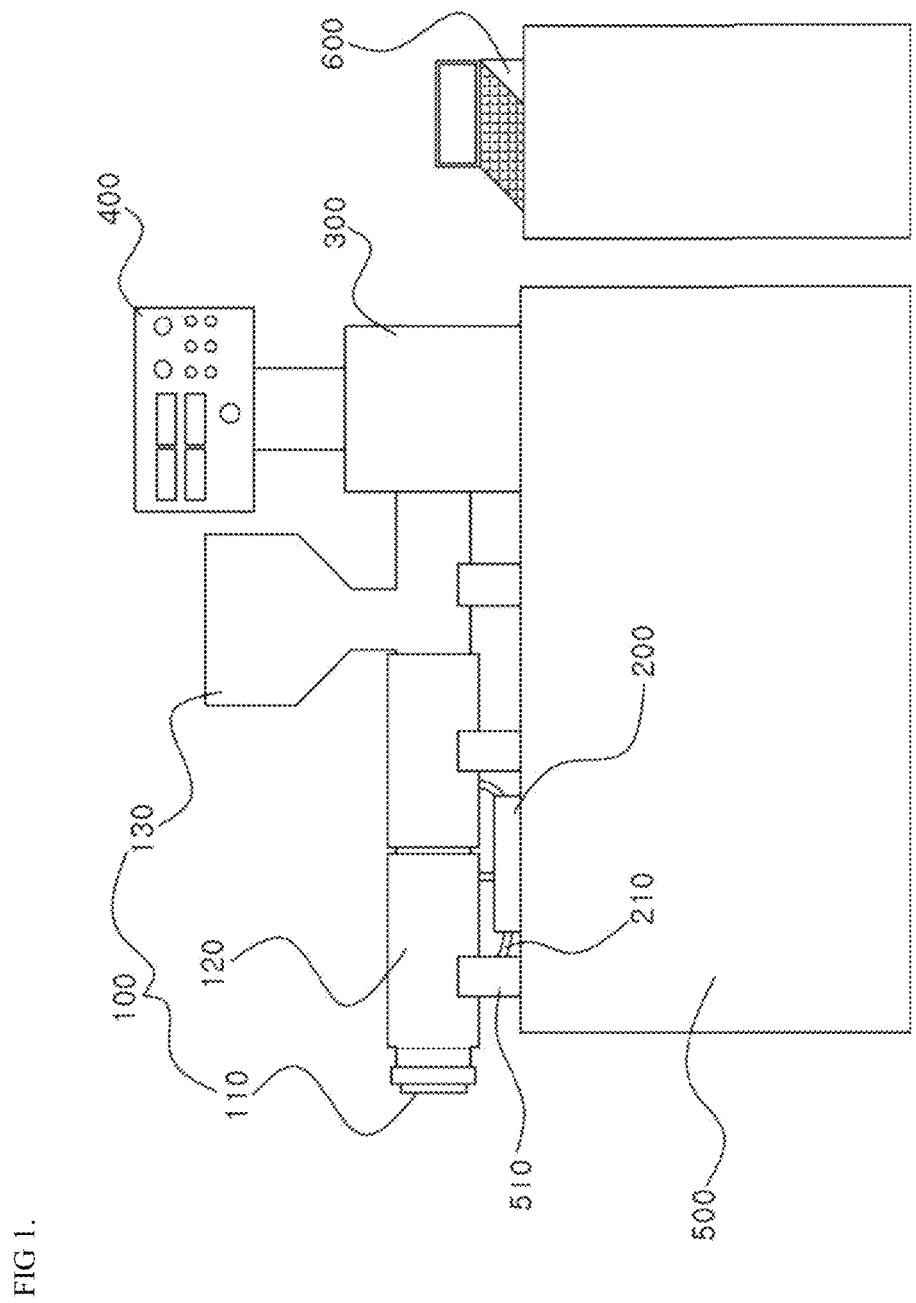
FIG. 1 is a front view of a device for measuring rheological properties of a high-viscosity material according to the present invention.

100: first measurer, 110: discharger, 111: first discharge end portion, 112: first opening/closing portion, 113: through-hole, 120: temperature maintainer, 130: first inlet, 132: second inlet, 140: first screw, 141: first blade portion, 142: second screw, 143: second blade portion, 144: first support portion, 145: second support portion, 146: third blade portion, 147: third screw, 147-1: fourth screw, 147-2: fifth screw, 148: fourth blade portion, 149: third measurer, 150: first end portion

200: second transmitter, 210: second measurer, 220: third measurer

300: first controller

400: second controller

500: support portion, 510: first protruding portion

600: sixth device

S110: first step, S120: second step, S130: third step, S140: fourth step, S150: fifth step

BEST MODE OF THE INVENTION

Hereinafter, the present invention will be described in detail through embodiments.

The objectives, features, and advantages of the present invention will be easily understood from the embodiments below.

The present invention is not limited to the embodiments disclosed herein and may be embodied in other forms. The embodiments disclosed herein are provided to sufficiently convey the spirit of the present invention to those of ordinary skill in the art to which the present invention pertains, and the present invention should be understood as including all modifications, equivalents, or substitutes included in the technical spirit and technical scope of the present invention.

Therefore, the present invention should not be limited by the embodiments below and should be understood as including all modifications included in the technical spirit and technical scope of the present invention. That is, those of ordinary skill in the art to which the present invention pertains may make various modifications or changes to the present invention by adding, changing, or omitting elements within the scope not departing from the spirit of the present invention defined in the claims, and such modifications or changes also belong to the scope of the present invention.

Since various modifications may be made to the present invention and the present invention may have various embodiments, specific embodiments will be illustrated in the drawings and described. In the drawings, the sizes of elements or relative sizes between different elements may be somewhat exaggerated for clear understanding of the present invention. Also, the shapes of elements illustrated in the drawings may be somewhat changed due to variations or the like in a manufacturing process.

Therefore, the embodiments disclosed herein are not limited by the shapes illustrated in the drawings unless mentioned otherwise and should be understood as including some degree of deformation.

Meanwhile, various embodiments of the present invention may be combined with some other embodiments unless precisely indicated otherwise. In particular, a certain feature indicated as being preferable or advantageous may also be combined with another certain feature or features indicated as being preferable or advantageous. That is, various aspects, features, embodiments, or implementation examples of the present invention may be used alone or in various combinations.

It should be understood that the terms used herein are only for describing specific embodiments and are not intended to limit the present invention by the claims. Unless mentioned otherwise, all terms including technical or scientific terms used herein have the same meaning as commonly understood by those of ordinary skill in the art. A singular expression includes a plural expression unless the context precisely indicates otherwise.

In describing the present invention, when detailed description of known related art is deemed as having the possibility of obscuring the gist of the present invention, the detailed description thereof will be omitted.

First Embodiment

Figure 2:
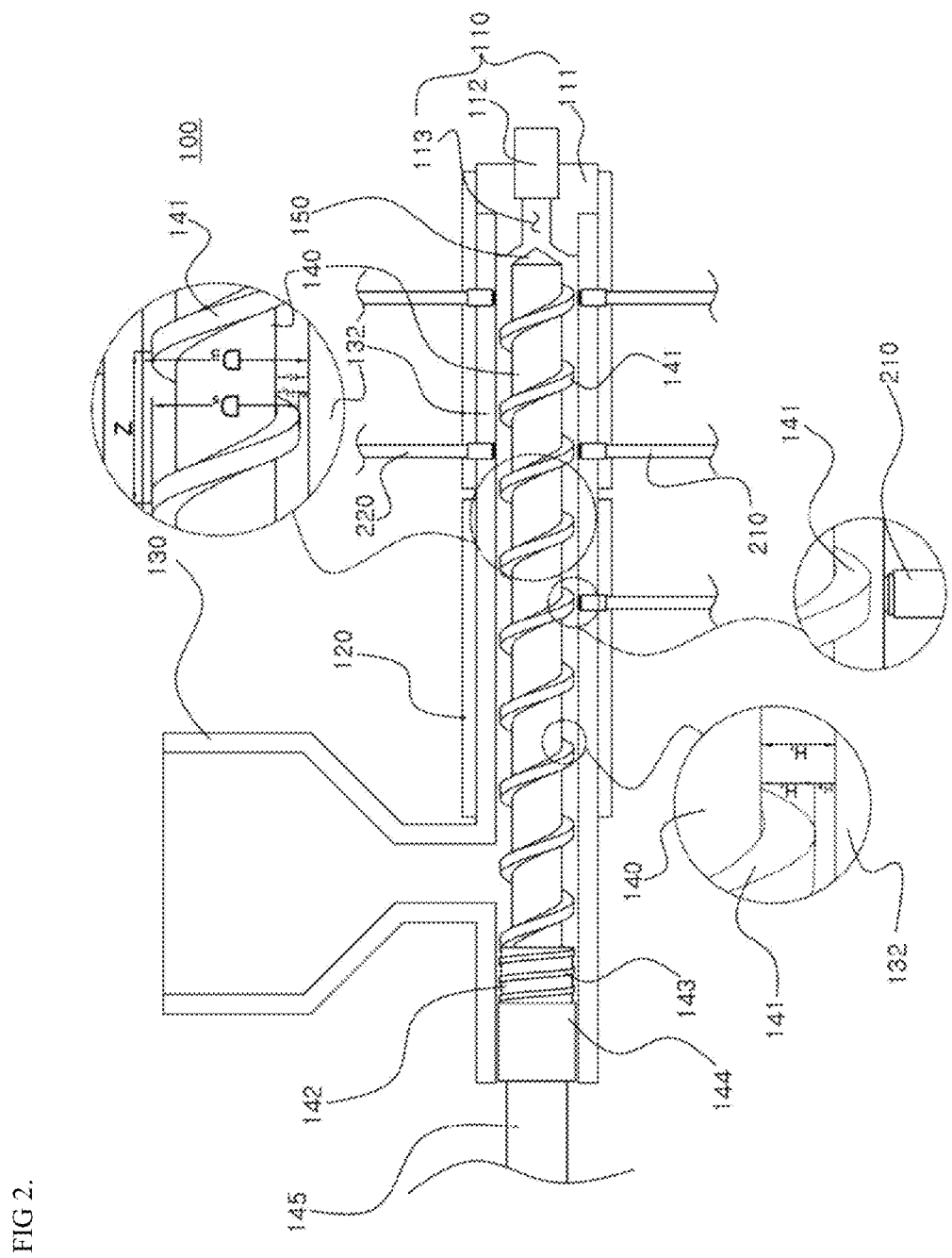
FIG. 2 is a cross-sectional view of a portion of the device for measuring rheological properties of a high-viscosity material according to the present invention.

As illustrated in FIGS. 1 and 2, a device for measuring rheological properties of a high-viscosity material (hereinafter referred to as "material" for convenience of description) according to the present invention may be formed to include a first measurer 100, a second transmitter 200, a first controller 300, and a second controller 400.

First, as illustrated in FIG. 2, the first measurer 100 may be formed to include a discharger 110, a temperature maintainer 120, a first inlet 130, and a first screw 140.

Further, the first measurer 100 may be formed to include one or more first screws 140 therein.

Due to the first measurer 100 being included, physical properties including a viscosity, a viscosity function, a relaxation time, and the like of the material, whose physical properties are to be measured, may be measured, and thus, rheological properties of the material may be reproducibly measured.

Here, the material measured by the first measurer 100 may be a flowable material including food, thermoplastic resins, rubber, slurries of fillers and dispersion fluids, a multi-component slurry using an emulsifier or the like, such as weaning food, flour dough, food paste, a cosmetic material, a secondary battery, or an electrode slurry, and may include a material whose viscosity is conventionally difficult to measure due to being high and has a viscosity of at least 50 cP (cP=centipoise=mPa-sec) at a measurement temperature at which a user desires to measure viscosity. However, the material measured by the first measurer 100 is, of course, not limited thereto.

Here, the measurement temperature at which the user desires to measure the viscosity may be 25° C. but may vary according to the user's need.

First, the discharger 110 of the first measurer 100 may be formed to facilitate the measurement of the rheological properties of the high-viscosity material in the first measurer 100 and discharge of the high-viscosity material to the outside.

To this end, the discharger 110 may be formed at one side end portion or the other side end portion of the first measurer 100 so as to be easily opened and closed and may not only easily measure rheological properties of the material moved toward the discharger 110 due to rotation of the first screw 140 but also easily discharge the material to the outside after the measurement is completed.

Also, when measuring the rheological properties of the material, since the measurement is performed in a state in which the discharger 110 is closed, there are advantages that, not only is it possible to perform the measurement after the material sufficiently melts due to temperature of the temperature maintainer 120, but also, by maintaining a flow rate at an end portion of the first measurer 100 at 0, finally-measured data may be measured as a function value and thus may be reproducibly measured.

Preferably, the discharger 110 may be formed on any one end portion selected from one side and the other side of a second inlet 132 but, of course, is not limited thereto.

To this end, the discharger 110 may be formed to include a first discharge end portion 111 and a first opening/closing portion 112.

First, the first discharge end portion 111 may be formed at an end portion of the first measurer 100 and may be, while accommodating the material moved due to the first screw 140, formed to include a space that may be combined with the first opening/closing portion 112 and thus formed to include a through-hole 113 that facilitates opening and closing of the discharger 110.

When the first opening/closing portion 112 is combined with the other side of the through-hole 113 formed at the first discharge end portion 111, in order to prevent the first opening/closing portion 112 from being detached to the outside due to the pressure of the material, one side of the through-hole 113 may be formed to be narrower than the other side of the through-hole 113 so that the pressure applied to the first opening/closing portion 112 due to the material entering the first discharge end portion 111 is minimized. However, the present invention is, of course, not limited thereto.

Next, the first opening/closing portion 112 may be formed so that any one end selected from one side and the other side is inserted into the first discharge end portion 111 and coupled thereto. In this way, opening and closing of the discharger 110 may be easily performed by the user's manipulation.

That is, when closing the discharger 110, the first opening/closing portion 112 may be inserted into one side or the other side of the through-hole 113 included in the first discharge end portion 111 in order to keep the discharger 110 closed, and when opening the discharger 110, the first opening/closing portion 112 may be separated from the through-hole 113 included in the first discharge end portion 111 in order to open the discharger 110.

Here, for the coupling between the first discharge end portion 111 and the first opening/closing portion 112, any one selected from screw-coupling and insertion-coupling may be performed, but as long as measurement values including the pressure, temperature, rotational speed, and the like applied to the material at the time of measuring physical properties of the material do not cause detachment of the first opening/closing portion 112 and as long as leakage or the like does not occur, the coupling method is, of course, not limited thereto.

Next, the temperature maintainer 120 may be formed on any one selected from the outside and the inside of the first measurer 100 so that the temperature inside the first measurer 100 is maintained to be constant.

Due to the temperature maintainer 120 being formed, molecular motion is achieved due to the temperature of the temperature maintainer 120 in the material included in the first measurer 100, and thus viscosity is lowered. In this way, the physical properties of the material may be reproducibly achieved.

Therefore, due to the temperature maintainer 120, without separately diluting the material, the time during which the material is melted or softened may be minimized to minimize the time during which the material is exposed to high temperatures while melting or softening the material. In this way, there is an advantage of being able to minimize the degeneration of the material and improve the reproducibility of rheological properties.

Preferably, the temperature maintainer 120 may be formed in a form surrounding an outer side surface of the first measurer 100, and most preferably, the temperature maintainer 120 may be formed in a form surrounding an outer side surface of the second inlet 132 included in the first measurer 100 to minimize damage to the temperature maintainer 120 caused by the pressure, temperature, rotational speed, and the like of the material. However, the temperature maintainer 120 is, of course, not limited thereto.

Here, the temperature maintainer 120 may be formed to interwork with the second controller 400 so that, due to the temperature maintainer 120, the temperature inside the first measurer 100 maintains a temperature input to the second controller 400.

To this end, a third measurer 220 formed to interwork with the first measurer 100 may be selectively further included to allow the temperature of the material formed inside the first measurer 100 to be observed in real time by the second controller 400, but the present invention is, of course, not limited thereto.

Selectively, measurement may be performed while an initial temperature of the temperature maintainer 120 is maintained to be high.

In more detail, the temperature of the material increases as a first blade portion 141 rotates due to rotation of the first screw 140, and here, measurement may be performed while the initial temperature of the material is maintained by inducing viscous heating by causing the first screw 140 to rotate at high speed so that the material in the first measurer 100 rapidly moves.

In this case, since a significant difference may occur between the temperature of the temperature maintainer 120 and the temperature of the material, preferably, the temperature of the material may be directly measured by the third measurer 220, but the present invention is, of course, not limited thereto.

Further, the third measurer 220 may be formed to extend in a direction facing a side surface that faces a second measurer 210, but as long as the position is for directly measuring the temperature of the material included in the first measurer 100, the position of the third measurer 220 is, of course, not limited thereto.

In this way, as molecular motion in the material is achieved within a short time due to high temperatures, a phenomenon in which viscosity lowers at a low shear rate promptly occurs, and simultaneously, measurement values including pressure, temperature, rotational speed, and the like are promptly measured while the material is cooled, and thus the measurement of rheological properties of the material may be sufficiently performed.

To this end, viscosity is measured while gradually decreasing the speed of the first screw 140, and thus viscosity measurement may be performed in a state in which the measurement temperature is maintained to be constant for a long period of time within an error range.

That is, since the measurement temperature of the physical properties measurement is within an error range while the material is cooled, there is an advantage of being able to reproducibly measure the physical properties.

Here, the measurement temperature may be about ±5° C. of the temperature at which the user desires to measure viscosity and, preferably, may be less than or equal to ±2° C. thereof, but the measurement temperature may vary according to the user's choice or the material's characteristics.

Selectively, when a rate at which the temperature of the material decreases is high, the temperature may be maintained to be constant within an error range by adjustment such as increasing the speed of the first screw 140, but the present invention is, of course, not limited thereto.

Next, the first inlet 130 may be formed to have one open side so that the material to be measured enters the first measurer 100.

In more detail, the first inlet 130 may be formed in the shape of a hopper having an open upper side to, while accommodating the material entering from the upper side, allow the material to enter the second inlet 132.

Here, the second inlet 132 may be formed below the first inlet 130 so as to interwork with the first inlet 130 and may be formed to extend in the horizontal direction to allow the material entering from the first inlet 130 to easily enter the second inlet 132.

That is, as illustrated in FIGS. 1 and 2, the first inlet 130 formed to extend upward may be formed in the shape of a hopper on any one selected from one side and the other side of an upper side of the second inlet 132.

Also, the first inlet 130 may further include various forms of auxiliary feeding devices such as a roller feeder to allow a band formed in the shape of a plate made of rubber or the like or a sample of an indeterminate form to easily enter the first inlet 130, but the first inlet 130 is, of course, not limited thereto.

In this way, the material entering the first inlet 130 enters the second inlet 132, and measurement values including pressure, temperature, rotational speed, and the like are measured in order to measure rheological properties of the material.

Here, the second inlet 132 may be formed hollow to include a sufficient space therein to not only include the material therein but also include any one selected from the discharger 110 and the first screw 140 therein.

Preferably, the first screw 140 may be inserted into the second inlet 132, and the discharger 110 may be formed on any one end portion selected from one side and the other side of the second inlet 132 so that measurement values including pressure, temperature, rotational speed, and the like are easily measured simultaneously as the material is inserted into the second inlet 132. However, the present invention is, of course, not limited thereto.

Next, the first screw 140 may be inserted into the first measurer 100 to easily push the material included in the first measurer 100 toward the discharger 110 and, simultaneously, may protrude outward to control the temperature of the material according to the rotational speed. The first screw 140 may be formed to include one or more first blade portions 141 formed to surround an outer peripheral surface.

In more detail, the first screw 140 may be inserted into the second inlet 132 and may be formed so that, after the material enters from the outside through the first inlet 130, the material enters the second inlet 132 and moves toward the discharger 110 due to rotation of the first screw 140.

Here, the first screw 140 may be formed to include the first blade portion 141, a second screw 142, a first support portion 144, and a first end portion 150.

First, the first blade portion 141 may be formed to protrude outward to surround an outer peripheral surface of the first screw 140 and allow the material to move toward the discharger 110 due to rotation of the first screw 140.

Here, pressure may be applied to the material simultaneously as the material moves due to rotation of the first screw 140, and at the same time, the temperature maintainer 120 may measure a change in pressure of the material due to the temperature of the material in order to measure physical properties including viscosity, shear rate, relaxation time, and the like of the material that are caused by the change in pressure of the material. However, the present invention is, of course, not limited thereto.

To this end, Z, which is an interval between the first blade portions 141, may be formed to have a length that is less than or equal to $3D_B$ based on $D_B$ which is an inner diameter of the first measurer 100.

Preferably, the first blade portions 141 may be formed at intervals less than or equal to $2.5D_B$ based on $D_B$, which is the inner diameter of the first measurer 100, along the length of the first screw 140, and most preferably, the first blade portions 141 may be formed at intervals in the range of $0.25D_B$ to $2.5D_B$, but the interval between the first blade portions 141 is, of course, not limited thereto.

When the interval between the first blade portions 141 is formed to be larger than $3D_B$, there is a disadvantage in that manufacturing costs increase due to an increase in the overall size of the device due to the interval between the first blade portions 141.

Further, when the length of the first screw 140 is formed to be short, the overall size of the device for measuring rheological properties of a high-viscosity material may be reduced, but the present invention is, of course, not limited thereto.

Next, the second screw 142 may be formed to extend in the longitudinal direction from any one end selected from one side and the other side of the first screw 140.

Preferably, the second screw 142 may be formed to extend in the longitudinal direction of the first screw 140 from an end of the first screw 140 in a direction facing the discharger 110.

By the second screw 142 being further included, the first screw 140 may stably rotate, and simultaneously, impurities such as air that have entered the first measurer 100 may be discharged to the outside.

To this end, the second screw 142 may be formed to have a size that is larger than or equal to the size of the first screw 140, but the second screw 142 is, of course, not limited thereto.

Selectively, the second screw 142 and the first screw 140 may be integrally formed, but the second screw 142 may also be selectively coupled to the first screw 140 by any one selected from rotary coupling or insertion-coupling to allow the first screw 140 to be easily replaced according to the material. However, the second screw 142 is, of course, not limited thereto.

Here, the second screw 142 may further include a second blade portion 143 which surrounds an outer surface and is formed by any one selected from protruding outward and being recessed.

By the second blade portion 143 being further included, the material entering toward the second screw 142 may easily move toward the discharger 110 via the first screw 140 and the first blade portion 141 due to rotation of the second screw 142, or impurities such as air that have entered the first measurer 100 may be discharged to the outside.

Next, the first screw 140 may further include the first end portion 150 formed to extend in the longitudinal direction from any one end portion selected from one side and the other side of the first screw 140.

Preferably, the first end portion 150 may be formed in a shape that gradually narrows in the longitudinal direction to allow the material moving due to rotation of the first screw 140 to easily move to an end of the discharger 110.

To this end, the first end portion 150 may be formed to extend in the longitudinal direction from an end of the first screw 140 formed at a position adjacent to the discharger 110, but the first end portion 150 is, of course, not limited thereto.

Next, the second transmitter 200 may be formed to interwork with any one selected from the first measurer 100 and the first controller 300 and may be formed to measure measurement values, including any one or more selected from the pressure, temperature, rotational speed, and the like of the material included in the first measurer 100, in order to calculate rheological properties of the material.

Due to the second transmitter 200 being formed, data of any one selected from the temperature, pressure, rotational speed, and the like measured by the second measurer 210 may be sent to the second controller 400 or a sixth device 600 in order to observe or calculate the measurement values or physical properties of the material.

Preferably, by the second transmitter 200 measuring the pressure of the material formed inside the first measurer 100, it is possible to calculate physical properties including viscosity, shear rate, relaxation time, and the like according to a change in pressure of the material included in the first measurer 100.

Here, the second transmitter 200 may further include the second measurer 210 which is formed to be spaced apart from the first measurer 100 and formed to interwork with the first measurer 100.

In more detail, one or more second measurers 210 may be formed to extend outward from an outer side of the second transmitter 200 and may have an end passing through an outer surface of the first measurer 100 to allow interworking with the first measurer 100.

Here, a measurement device for measuring measurement values including the pressure, temperature, rotational speed, and the like of the material included in the first measurer 100 may be included at an end of the second measurer 210.

Therefore, by sending values obtained by the second measurer 210 measuring physical properties of the material included in the first measurer 100 to the second transmitter 200 and further sending the values to the second controller 400, it is possible to calculate, observe, or predict the measurement values including the temperature and pressure of the material.

Preferably, any one selected from the second measurer 210 and the third measurer 220 may be provided as two or more second measurers 210 or two or more third measurers 220 to obtain a function value by calculating the physical properties of the material included in the first measurer 100 by measuring the measurement values or physical properties of the material disposed at a site adjacent to the discharger 110 and measuring the measurement values or physical properties of the material formed to be spaced apart from the discharger 110. However, the present invention is, of course, not limited thereto.

Here, the second measurer 210 may be formed to have a size that is larger than or equal to the interval between the first blade portions 141 formed to protrude outward along the outer diameter of the first screw 140.

Preferably, due to the second measurer 210 being formed at a position adjacent to the first blade portion 141, any one selected from the measurement values and physical properties of the material may be reproducibly measured. However, the second measurer 210 is, of course, not limited thereto.

Most preferably, a pressure value of the material may be measured by the second measurer 210 so that rheological properties are able to be measured using a calculation formula. However, the second measurer 210 is, of course, not limited thereto.

When, as illustrated in FIG. 2, the length of an outer diameter of the first blade portion 141 is Ds, an inner diameter of a portion where the first screw 140 is formed in the first measurer 100 is $D_B$, and the interval between the first blade portions 141 is Z, in the case in which Z, which is the interval between the first blade portions 141, is formed to have a length equal to $D_B$ based on $D_B$, the second measurers 210 may be formed at intervals equal to $D_B$ so that an end portion of the outer diameter of the first blade portion 141 is able to be formed at a position adjacent to an inner surface of the first measurer 100.

Here, the second measurers 210 may be formed at intervals equal to $nD_B$ according to any one selected from the number of second measurers 210, the length of the first screw 140, or the interval between the first blade portions 141, but as long as the interval allows the outer diameter of the first blade portion 141 to be formed at a position adjacent to the inner surface of the first measurer 100 as much as possible, the interval between the second measurers 210 is, of course, not limited thereto.

Here, n represents 0, 1, 2, 3, and 4 and, preferably, may be 1 and 2. Preferably, n may include any one selected from integers and decimals.

Preferably, n may include any one selected from decimals such as 0.5 (½), 0.25 (¼), 0.125 (⅛), and 0.0625 (1/16) but is, of course, not limited thereto.

When n is 0, the second measurers 210 may be formed to extend in the longitudinal direction from side surfaces facing each other, but the present invention is, of course, not limited thereto.

Further, when n is 1 or larger, the second measurers 210 may be formed at intervals of $nD_B$ in the longitudinal direction, based on a single second measurer 210.

Accordingly, by the measurement values measured by the one or more second measurers 210, the viscosity of the material may be calculated and a viscosity function value may be reproducibly measured.

Next, the first controller 300 may be formed to interwork with the first measurer 100 and control rotation of the first screw 140.

Preferably, any one selected from a motor and a decelerator may be provided as one or more motors or one or more decelerators inside the first controller 300 in order to, as the first controller 300 and the first screw 140 are formed to interwork, transmit a rotational force of the motor included in the first controller 300 to the first screw 140 to rotate the first screw 140.

That is, as the first screw 140 rotates due to the first controller 300, the material included in the first measurer 100 may move toward the discharger 110 due to rotation of the first screw 140, and simultaneously, measurement values applied to the material may be measured by the second measurer 210 in order to measure the measurement values including temperature, pressure, rotational speed, and the like.

Here, since the first controller 300 is formed to interwork with the second controller 400, when a rotational speed is input from the second controller 400, the motor included in the first controller 300 may be driven, and simultaneously, rotation of the first screw 140 may be performed.

Next, the second controller 400 may be formed to interwork to control any one selected from the first measurer 100, the second transmitter 200, and the first controller 300.

The second controller 400 may be formed to control any one selected from the first measurer 100, the second transmitter 200, and the first controller 300 using a value input by the user or may be formed to control the on/off of the device for measuring rheological properties of a high-viscosity material, which is the present invention, to, while measuring physical properties of the material introduced into the first measurer 100, observe measured values in real time.

Here, when the second controller 400 is formed to interwork with the first measurer 100, the second controller 400 may be formed to interwork with the temperature maintainer 120 formed in the first measurer 100 to easily control the temperature inside the first measurer 100, but the second controller 400 is, of course, not limited thereto.

Further, by being formed to interwork with the sixth device 600, the second controller 400 may receive data transmitted from any one selected from the first measurer 100, the second transmitter 200, and the first controller 300 and easily calculate a function value of physical properties of the material.

Here, the sixth device 600 may be formed to interwork with the second controller 400 and may be formed to selectively interwork with any one selected from the first measurer 100, the second transmitter 200, and the first controller 300, but the sixth device 600 is, of course, not limited thereto.

To this end, the sixth device 600 may be an automatic controller and may be formed to receive data transmitted from any one selected from the first measurer 100, the second transmitter 200, the first controller 300, and the second controller 400 or to transmit and receive a control signal so that the temperature of the material may be maintained within an error range due to rotation of the first screw 140.

Preferably, a signal to control the temperature of the material, the rotational speed of the first screw 140, and the like may be sent from the sixth device 600 to any one selected from the first controller 300 and the second controller 400, and the sixth device 600 may receive any one of the measured temperature, pressure, rotational speed, and the like of the material from any one selected from the first measurer 100, the second transmitter 200, the first controller 300, and the second controller 400. In this way, the sixth device 600 may be formed to easily calculate measurement values of the material, but the sixth device 600 is, of course, not limited thereto.

The device for measuring rheological properties of a high-viscosity material that is formed as described above may use the calculation formulas below to easily calculate a viscosity and a shear rate at a wall, which are physical properties of the material.

For example, when measuring a viscosity of the material by a change in pressure of the material, the measurement may be performed using the following calculation formula.

This calculation formula is a formula applied when Z is $D_B$ but, of course, is not limited thereto.

$$\mu = \frac{1}{6}\left(\frac{H_t}{\pi D_B}\right)^2 \frac{\Delta P}{nN} \qquad \text{[Calculation Formula 1]}$$

μ: viscosity $H_t$: distance between the outer diameter of the first screw 140 and the inner surface of the first measurer 100

$D_B$: inner diameter of the position where the first screw 140 is included in the first measurer 100

ΔP: pressure n: number of intervals Z between the first blade portions 141 included between the second measurers 210

N: rotational speed (rps) of the first screw 140

Further, the following calculation formula may be used to measure the shear rate at an inner wall of the first measurer 100.

$$\bar{\gamma}_\omega = \frac{4\pi D_B N}{H_t} \quad \text{[Calculation Formula 2]}$$

$\bar{\gamma}_w$: shear rate at wall

That is, by the device for measuring rheological properties of a high-viscosity material, which is the present invention, measuring the pressure of the material, the viscosity, shear rate at a wall, and the like of the material may be calculated.

Here, since the discharger 110 maintains a closed state during the measurement, a flow rate is kept at 0, and thus physical properties of the material may be easily measured reproducibly.

The present invention formed as described above has an advantage of being able to precisely and reproducibly measure the viscosity of the material by measuring a change in pressure of the material.

Selectively, a support portion 500 formed to allow the first measurer 100 to be spaced apart from the ground may be further included on a lower side of the first measurer 100.

By the support portion 500 being further included, there is an advantage in that movement or installation of the first measurer 100 may be easily performed.

To this end, a mover including a caster or the like formed to protrude downward may be further included on a lower side surface of the support portion 500, but the support portion 500 is, of course, not limited thereto.

Here, one or more first protruding portions 510 formed to protrude upward may be further included on any one selected from one side and the other side of an upper side surface of the support portion 500.

Preferably, the first protruding portion 510 may be formed in a form surrounding a portion of a lower side surface of the second inlet 132 so that the second inlet 132 included in the first measurer 100 is spaced apart from the support portion 500.

Most preferably, the first protruding portion 510 may be formed in a form surrounding a lower side surface of the temperature maintainer 120 to, not only prevent damage to the support portion 500 due to a change in the temperature of the temperature maintainer 120, but also prevent a change in the physical properties of the material included in the first measurer 100 due to the temperature of the support portion 500.

As an embodiment, when two or more first protruding portions 510 are included, the first protruding portions 510 may be formed to have the same height to allow the material to move toward the discharger 110 due to the rotational force of the first screw 140.

Figure 7:
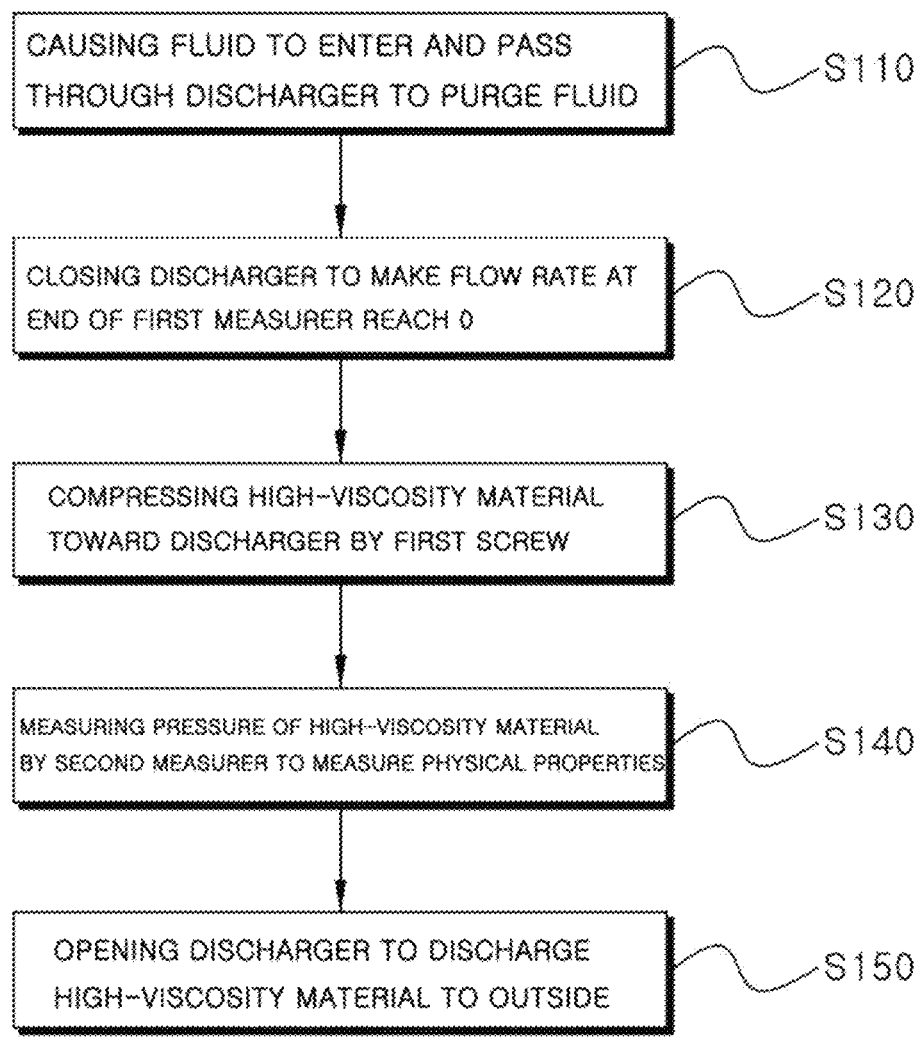
FIG. 7 is a process diagram according to a measurement method of the device for measuring rheological properties of a high-viscosity material according to the present invention.

Hereinafter, a measurement method of the device for measuring rheological properties of a high-viscosity material, which is the present invention, will be described in more detail with reference to FIG. 7.

1) A first step (S110) of causing a material, whose rheological properties are to be measured, to enter the first inlet 130 included in the first measurer 100 so that the material is accommodated in the first measurer 100 in a state in which the discharger 110 is open and then operating the first controller 300 by any one selected from the second controller 400 and the sixth device 600 to pass the material through the discharger 110 and purge the material is performed.

Here, the material entering due to the first inlet 130 may be moved between the second inlet 132 and the first screw 140.

Further, the amount of entering material may vary according to the interval between the first blade portions 141 or Hi, which is the distance between the outer diameter of the first screw 140 and the inner surface of the first measurer 100.

When Z, which is the interval between the first blade portions 141, is formed to have a length that is larger than or equal to $D_B$, which is the inner diameter of the first measurer 100, the material may be included in an amount as much as a length in a range of $3D_B$ to $12D_B$ allows.

Preferably, the material may be included in an amount as much as a length in a range of $5D_B$ to $8D_B$ allows, but the length of the material is, of course, not limited thereto.

When the material is included in an amount as much as a length less than $3D_B$ allows, there is a disadvantage of not being able to easily perform measurement due to a small amount of material, and when the material is included in an amount as much as a length larger than $12D_B$ allows, there is a disadvantage in that leakage of the material may occur.

Further, when the overall size of the device is reduced due to the size of the first screw 140 or the like and, simultaneously, the interval between the first blade portions 141 is formed to be less than $1D_B$, which is the length of the outer diameter of the first blade portion 141, the material may be included in an amount as much as the length less than $3D_B$ allows.

Preferably, the material may be included in an amount as much as a length less than $2.5D_B$ allows to promote measuring reproducible values due to size reduction of the device and a small amount of material, but the present invention is, of course, not limited thereto.

2) After the first step (S110) is performed, a second step (S120) of closing the discharger 110 of the first measurer 100 to make a flow rate at an end reach 0 is performed.

3) After the second step (S120) is performed, a third step (S130) of operating the first controller 300 by the second controller 400 to rotate the first screw 140 and move the material, whose physical properties are to be measured, toward the discharger 110 and performing any one selected from melting, degassing, kneading, and softening is performed.

4) After the third step (S130) is performed, a fourth step (S140) of changing the rotational speed of the first screw 140 to measure a change in pressure of the material, whose physical properties are to be measured, by the second measurer 210 and observe the physical properties is performed.

Here, by maintaining the speed of the first screw 140 for a predetermined amount of time throughout multiple steps, the pressure may be measured by the second measurer 210 which is formed to interwork with the first screw 140 and formed on any one selected from the upper side and lower side of the first measurer 100.

To this end, by directly measuring the temperature of the material by the third measurer 220, the temperature of the material may be maintained to be constant according to the speed of the first screw 140 within an error range.

Further, measurement values including the pressure, temperature, the rotational speed of the first screw 140, and the like that are measured by the second measurer 210 may be transmitted through the second transmitter 200 to any one selected from the first controller 300, the second controller 400, and the sixth device 600 formed to interwork with the second transmitter 200, and thus the pressure of the material whose physical properties are to be measured may be observed.

Also, due to the fourth step (S140) being performed, it is possible to monitor a viscosity function value which is obtained by real-time calculation of the physical properties of the material, whose physical properties are to be measured, using the calculation formulas.

5) After the fourth step (S140) is performed, a fifth step (S150) of opening the discharger 110 to discharge the material, whose physical properties are to be measured, to the outside may be performed.

When different materials are continuously measured, the measurement method may be carried out after performing a purging process, in which only the second step (S120) and the fifth step (S150) are performed, but the measurement method is, of course, not limited thereto.

MODES OF THE INVENTION

Second Embodiment

Figure 3:
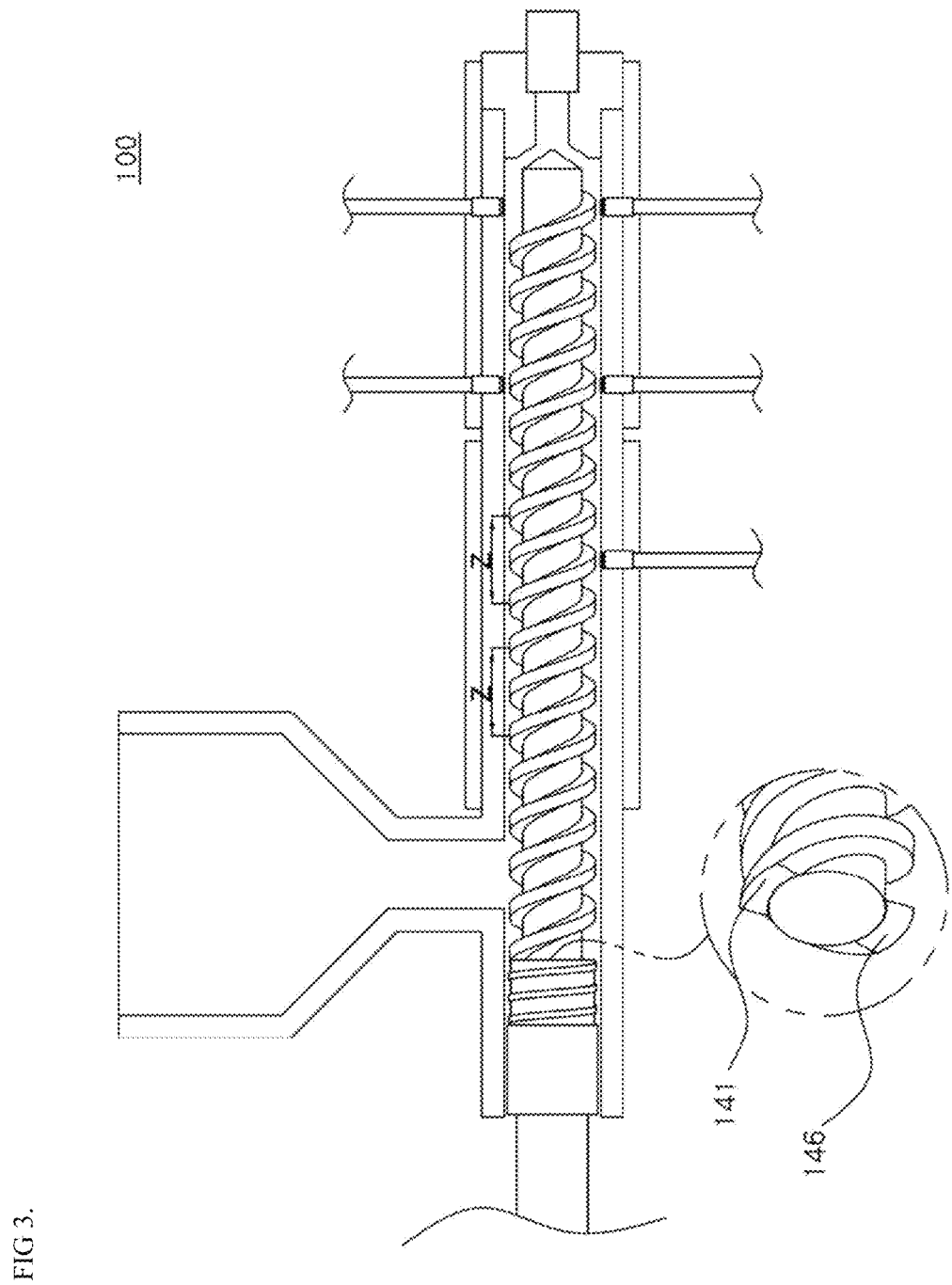
FIG. 3 is a partial cross-sectional view according to an embodiment of the present invention.

As illustrated in FIG. 3, the first measurer 100 may further include one or more third blade portions 146 which are formed to protrude outward from an end of any one selected from one side and the other side of the first screw 140 so as not to interfere with the first blade portion 141 and which are formed to surround the outer diameter of the first screw 140.

Due to the third blade portions 146 being further included, intervals between screw threads of the first screw 140 are formed to be narrow as a whole, and pressure is more evenly applied to the material included in the first measurer 100. Thus, physical properties may be more precisely measured.

To this end, based on a start point of the first blade portion 141 at any one selected from one side and the other side of the first screw 140, a start point of the third blade portion 146 may be spaced apart from the start point of the first blade portion 141 and formed on an outer surface of the first screw 140. In this way, the first blade portion 141 and the third blade portion 146 may be formed so as not to interfere with each other.

Here, the intervals between the third blade portions 146 may be formed to be the same as or different from the intervals between the first blade portions 141, but as long as the third blade portions 146 do not interfere with the first blade portions 141, the intervals between the third blade portions 146 are, of course, not limited thereto.

Most preferably, as illustrated in FIG. 3, the interval Z between the first blade portions 141 and the interval between the third blade portions 146 may be formed to be the same, and thus the first blade portion 141 and the third blade portion 146 may be formed so as not to interfere with each other.

Third Embodiment

Figure 4:
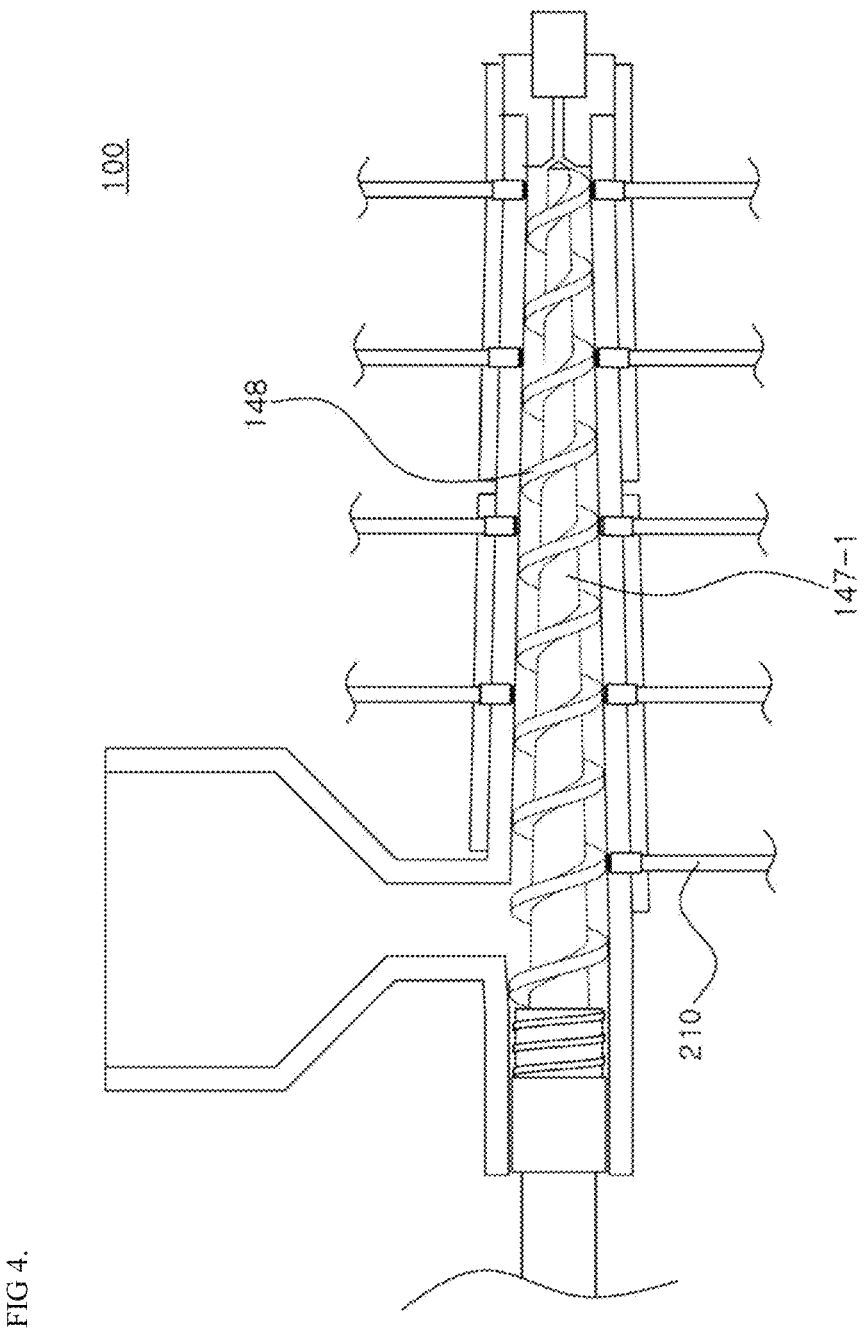
FIG. 4 is a partial cross-sectional view according to an embodiment of the present invention.

As illustrated in FIG. 4, the first measurer 100 may include a fourth screw 147-1, which is formed to have an outer diameter gradually decreasing toward the end and includes a fourth blade portion 148 formed to protrude outward to surround the outer diameter.

Preferably, the fourth screw 147-1 may be formed in any one shape selected from a step shape and an inclined shape that gradually decreases in size at intervals of a predetermined length.

Here, the inner diameter of the first measurer 100 may also be formed such that Ds, which is an outer diameter of the fourth blade portion 148, and $D_B$, which is an inner diameter of the first measurer 100, also gradually decrease so as to allow $H_B$, which is a distance between the fourth blade portion 148 and the inner surface of the first measurer 100, to maintain a predetermined value at each step portion. However, the present invention is, of course, not limited thereto.

Figure 5:
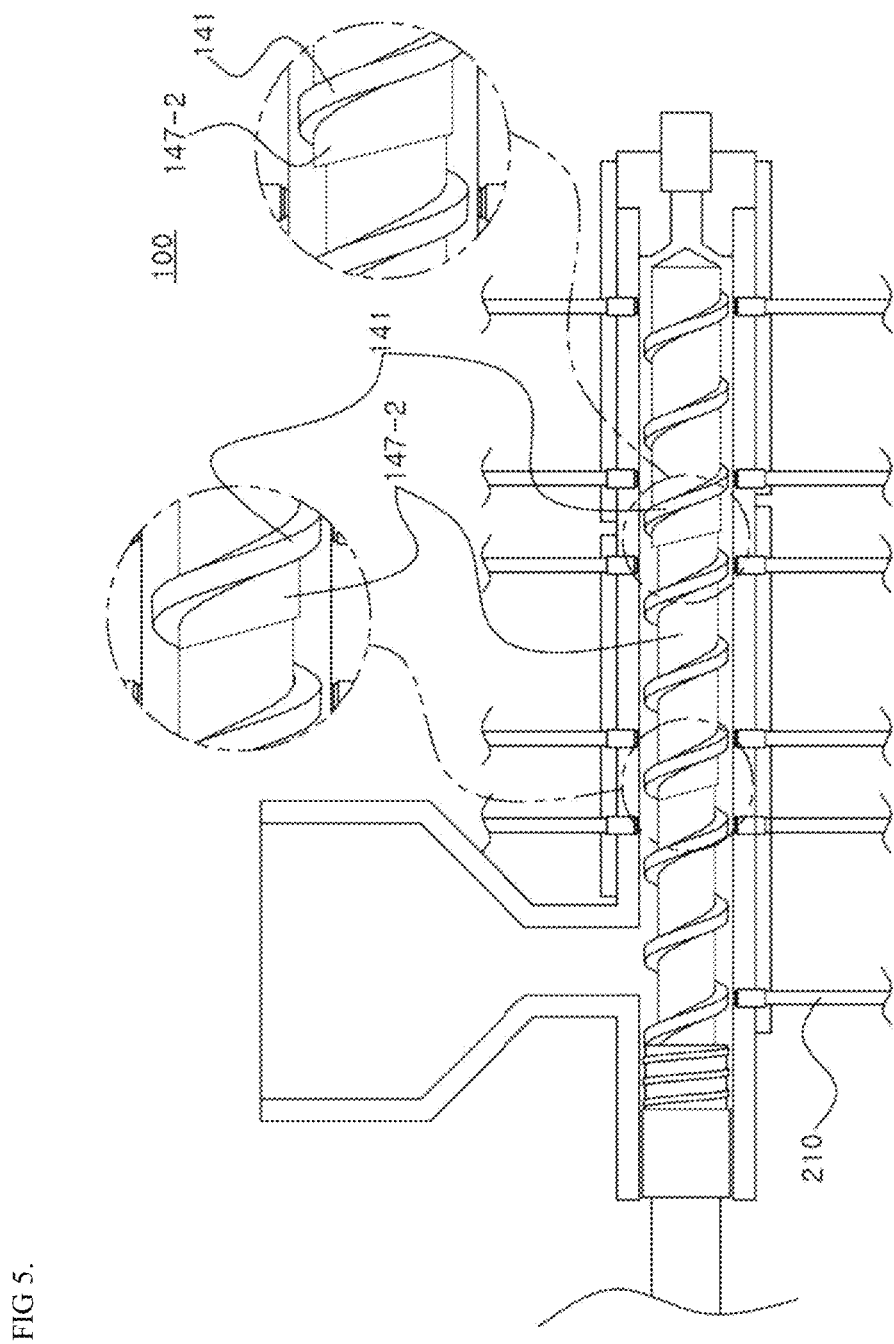
FIG. 5 is a partial cross-sectional view according to an embodiment of the present invention.

Further, as illustrated in FIG. 5, the first measurer 100 may include a fifth screw 147-2, which is formed to have an outer diameter gradually increasing toward the end and includes the first blade portion 141 formed to protrude outward to surround the outer diameter.

Here, the first blade portion 141 may be formed to surround an outer peripheral surface of the fifth screw 147-2, but the present invention is, of course, not limited thereto.

Due to the fifth screw 147-2 being formed, according to a change in $H_t$, which is a distance between an outer diameter of the fifth screw 147-2 and the inner surface of the first measurer 100, a change may occur in the temperature of the material whose physical properties are to be measured, and simultaneously, a pressure value may be changed.

Here, the outer diameter of the fifth screw 147-2 may be formed to increase stepwise.

Further, since the first blade portion 141 is formed to surround an outer side surface of the fifth screw 147-2, and $H_B$, which is a distance between the outer diameter of the first blade portion 141 and the inner surface of the first measurer 100, is maintained as a predetermined value at each step portion, according to a change in the thickness of the fifth screw 147-2, the temperature of the material may be differently measured during rotation at the same speed.

Accordingly, there is an advantage of being able to measure physical properties at various temperatures at one time through a single experiment.

To this end, any one selected from the second measurer 210 and the third measurer 220 may be formed to interwork, and thus there is an advantage of being able to measure physical properties at various temperatures at one time and easily calculate the same.

Fourth Embodiment

Figure 6:
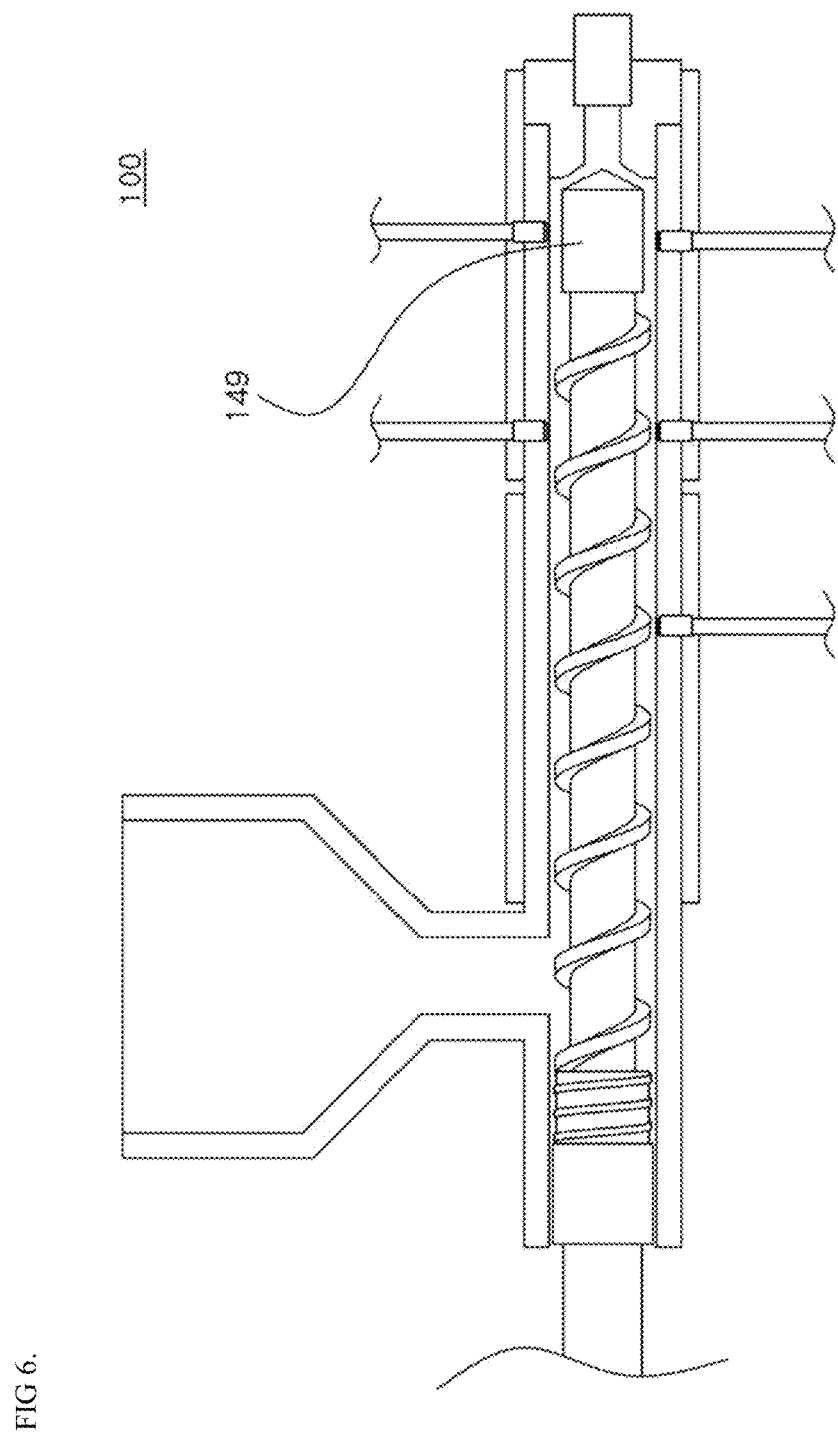
FIG. 6 is a partial cross-sectional view according to an embodiment of the present invention.

As illustrated in FIG. 6, the first measurer 100 may further include a third measurer 149 formed to protrude in the longitudinal direction from an end of the first screw 140.

Here, due to the third measurer 149 being further included, there is an advantage of being able to measure a relaxation time of the material.

In more detail, relaxation time is a typical viscoelastic property that allows assessing structural information according to a molecular weight size, molecular weight distribution, kneading, or mixing. Materials such as rubber have disadvantages in that, due to the state of the material not being evenly distributed in the material to be measured, physical properties are differently measured according to a site where the measurement of physical properties occurs, and due to a constant value being measured despite a change in the temperature, an error range widens.

Also, there is a disadvantage in that, due to large variations in pressure according to rotation, an initial value significantly changes at the time of measuring the relaxation time.

In order to make up for this, the third measurer 149 is formed to protrude from an end of the first screw 140, thus making it possible to measure the relaxation time of materials such as rubber.

Further, a viscosity or a shear rate at a wall may be measured at a site where the first blade portion 141 is formed, and simultaneously, the relaxation time may be measured at a site where the third measurer 149 is formed.

Also, as long as the relaxation time is able to be calculated using measured physical properties such as pressure, the present invention is, of course, not limited thereto.

To this end, one or more second measurers 210 may be further formed at the site where the third measurer 149 is formed, but the present invention is, of course, not limited thereto.

By continuously measuring changes over time of measurement values such as temperature and pressure that are received from the second measurer 210 formed at a position adjacent to any one selected from the third measurer 149 and the first blade portion 141, the relaxation time may be measured.

Figure 14:
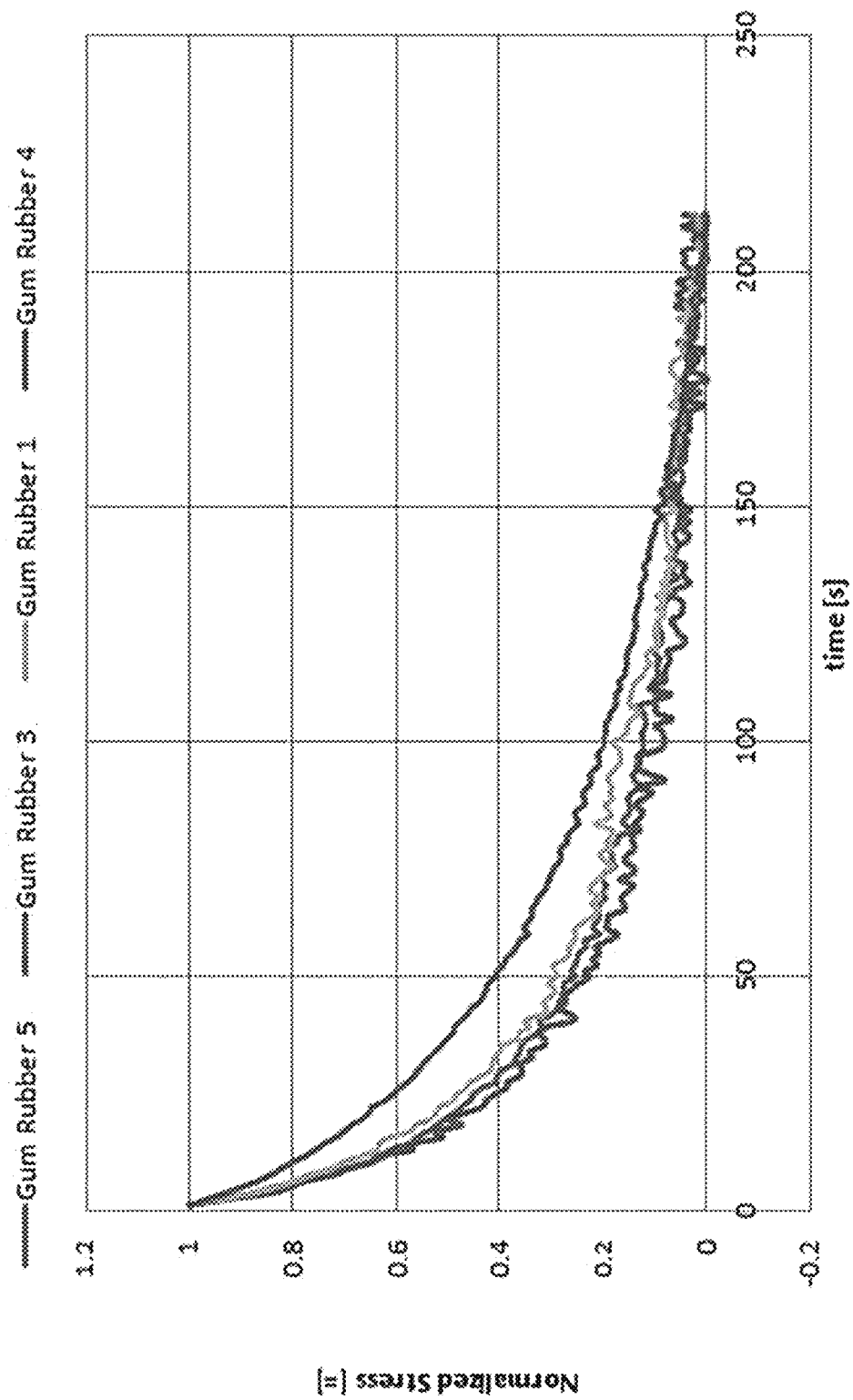
FIG. 14 is a graph showing a result of measuring rheological properties using a device for measuring rheological properties of a high-viscosity material according to Experimental Example 6.

When the first screw 140, which rotates due to the second controller 400 or the sixth device 600, is suddenly stopped, and physical properties measured by the second measurer 210 are continuously measured as measurement values over time by the second transmitter 200, from the moment the first screw 140 is stopped, the measurement values continue to decrease over time as illustrated in FIG. 14.

Here, when a measurement value at the moment the operation of the first screw 140 is stopped is $P_o$, and a change in the measurement value over time is $P(t)$, a converted measurement value may be expressed as $P(t)/P_o$, and this pressure change may be approximated by the calculation formula below.

However, as long as the formula is for approximating a decreasing change value using a logarithmic value, the calculation formula is not limited to the one below.

$$P(t) = P_0 \exp\left[\frac{t}{\lambda_c}\right]^\beta \qquad \text{[Calculation Formula 3]}$$

P(t): change in measurement value
$P_o$: measurement value at the moment the operation of the first screw 140 is stopped
t: time
$\lambda_c$: characteristic relaxation time
β: intensity factor Here, the relaxation time may be measured using the calculation formula below.

$$\lambda = \int_0^\infty \exp\left[\frac{t}{\lambda_c}\right]^\beta dt \qquad \text{[Calculation Formula 4]}$$

λ: relaxation time

In this way, there is an advantage of being able to calculate rheological properties including any one selected from a viscosity, a viscosity function, and viscoelasticity of a high-viscosity material by the third measurer 149 formed at an end of the first screw 140.

Also, regarding the relaxation time, any one of the relaxation time and characteristic relaxation time may be selectively used for user convenience.

Experimental Example 1

1) A first step (S110) of causing polyethylene, which is a material whose physical properties are to be measured, to enter the first inlet 130 included in the first measurer 100 so that polyethylene is accommodated in the first measurer 100 in a state in which the discharger 110 is open and then operating a first controller 300 by the second controller 400 to pass polyethylene through the discharger 110 and purge polyethylene was performed.

2) After the first step (S110) was performed, a second step (S120) of closing the discharger 110 of the first measurer 100 to make a flow rate at an end reach 0 was performed.

3) After the second step (S120) was performed, a third step (S130) of operating the first controller 300 by the second controller 400 to rotate the first screw 140 and move polyethylene toward the discharger 110 and increasing the temperature of the material to a temperature in a range of 180° C. to 220° C. to perform any one selected from melting and softening was performed.

4) After the third step (S130) was performed, a fourth step (S140) of changing the rotational speed of the first screw 140 to maintain the temperature to be constant and measuring a change in pressure of polyethylene by the second measurer 210 to observe physical properties of polyethylene was performed.

5) After the fourth step (S140) was performed, a fifth step (S150) of opening the discharger 110 to discharge polyethylene to the outside was performed.

6) After the fifth step (S150) was performed, a measured pressure value was applied to any one selected from Calculation Formula 1 and Calculation Formula 2 to calculate any one selected from the viscosity and shear rate of the material and draw a function graph.

Experimental Example 2

Except for applying polystyrene instead of polyethylene as the material whose physical properties are to be measured and maintaining the temperature of the material in a range of 200° C. to 240° C. in the third step (S130) in Experimental Example 1, Experimental Example 2 was performed in the same manner as Experimental Example 1.

Experimental Example 3

Except for applying low-density polyethylene (LDPE) instead of polyethylene as the material whose physical properties are to be measured in Experimental Example 1, Experimental Example 3 was performed in the same manner as Experimental Example 1.

Experimental Example 4

Except for applying different polylactic acids (PLAs) saturated at a relative humidity in a range of 59% to 74%, instead of polyethylene, as the material whose physical properties are to be measured and maintaining the temperature of the material at 185° C. in the third step (S130) in Experimental Example 1, Experimental Example 4 was performed in the same manner as Experimental Example 1.

Experimental Example 5

Except for applying polycarbonate instead of polyethylene as the material whose physical properties are to be measured and maintaining the temperature of the material in a range of 270° C. to 315° C. at 5° C. intervals in the third step (S130) in Experimental Example 1, Experimental Example 5 was performed in the same manner as Experimental Example 1.

Experimental Example 6

Except for applying the first screw 140 including the third measurer 149 to an end before performing the first step (S110), applying gum rubber cut in the form of a plate, instead of polyethylene, as the material whose physical properties are to be measured, and after performing the fourth step (S140), simultaneously stopping the device and measuring pressure at the site of the third measurer 149, and then applying Calculation Formulas 1 to 4 to measure viscosity, shear rate, and relaxation time in Experimental Example 1, Experimental Example 6 was performed in the same manner as Experimental Example 1.

Here, an experiment was performed to measure the viscosity and shear rate by varying the rotational speed of the first screw 140.

Figure 15:
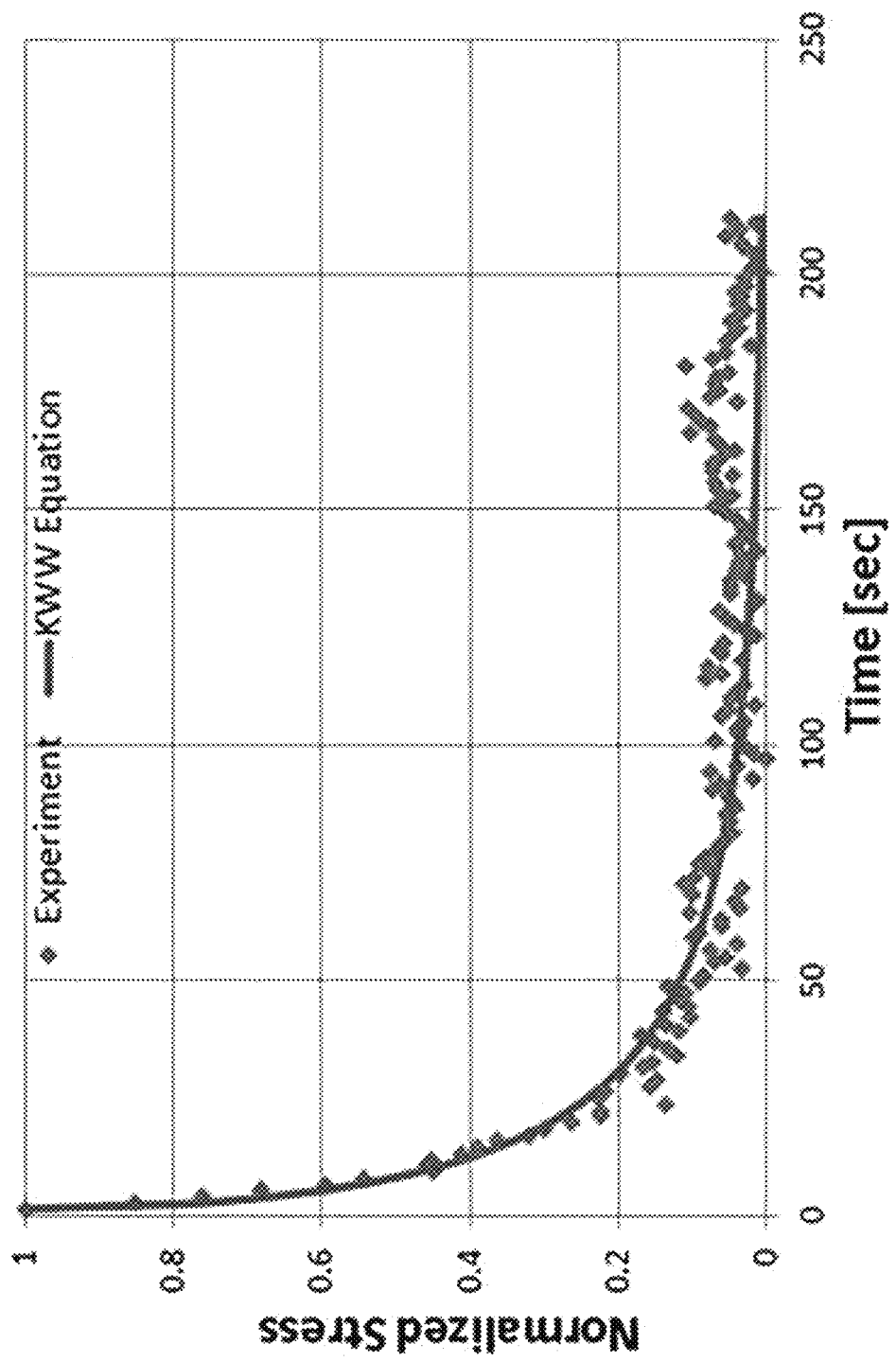
FIG. 15 is a graph showing a result of measuring rheological properties using a device for measuring rheological properties of a high-viscosity material according to Experimental Example 6.

Further, the Kohlrausch-Williams-Watts (KWW) Equation illustrated in FIG. 15 denotes Calculation Formula 4.

Experimental Example 7

Except for applying rubber compounds instead of gum rubber as the material whose physical properties are to be measured and measuring pressure at the site of the third measurer 149 in the fourth step (S140) in Experimental Example 6, Experimental Example 7 was performed in the same manner as Experimental Example 6.

Here, as rubber compounds COM1, COM2, COM3, and COM4, tire rubber in a state before vulcanization was applied. In the case of COM5, any one selected from rubbers applied to wires may be applied.

Experimental Example 8

Except for applying LDPE MFR10, instead of polyethylene, as the material whose physical properties are to be measured and maintaining the temperature of the material at 180° C. in the third step (S130) in Experimental Example 1, Experimental Example 8 was performed in the same manner as Experimental Example 1.

Here, as LDPE MFR10, LDPE MFR10 on which Bagley correction and Rabinowitch correction are performed may be applied.

Figure 8:
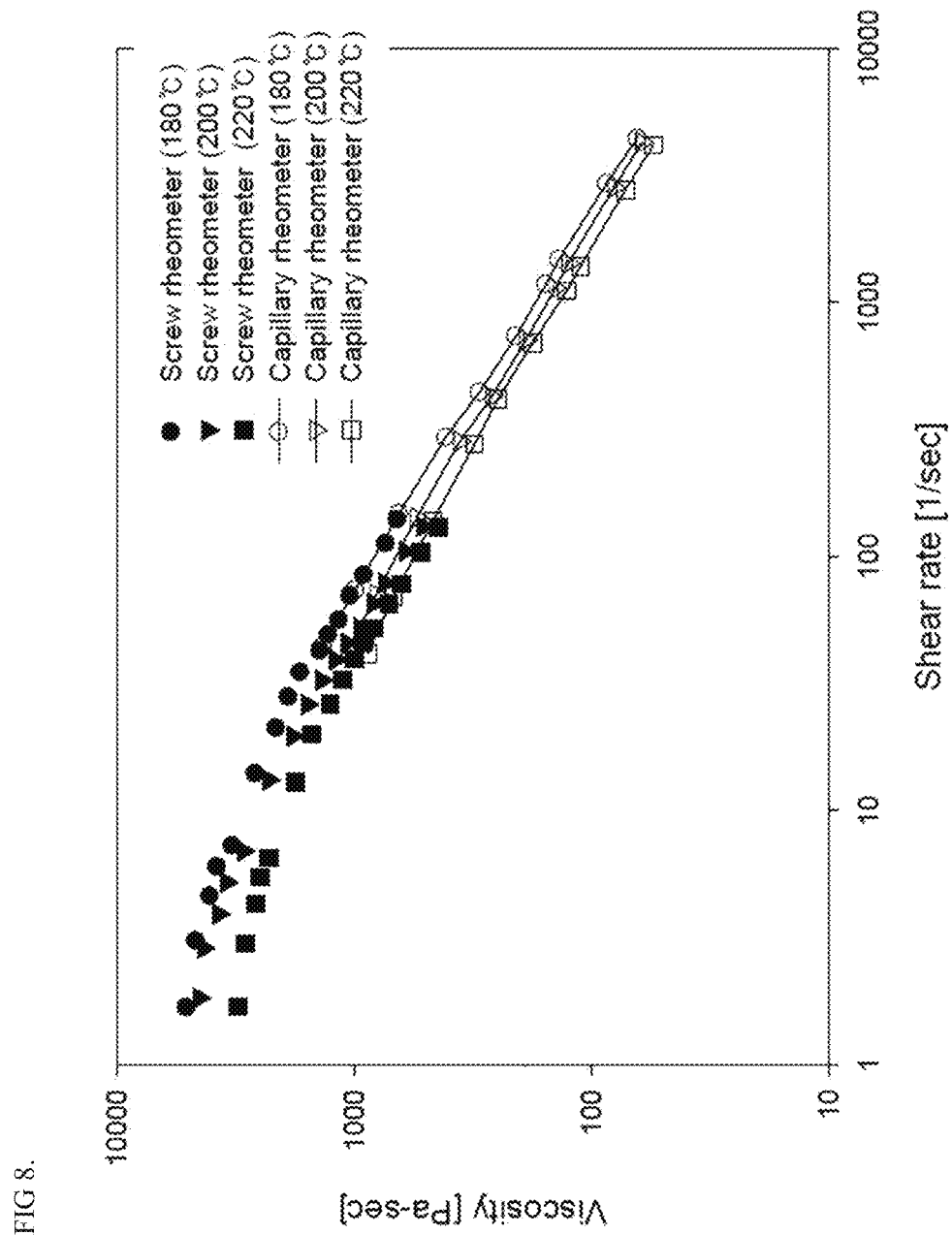
FIG. 8 is a graph showing a result of measuring rheological properties using a device for measuring rheological properties of a high-viscosity material according to Experimental Example 1.
Figure 9:
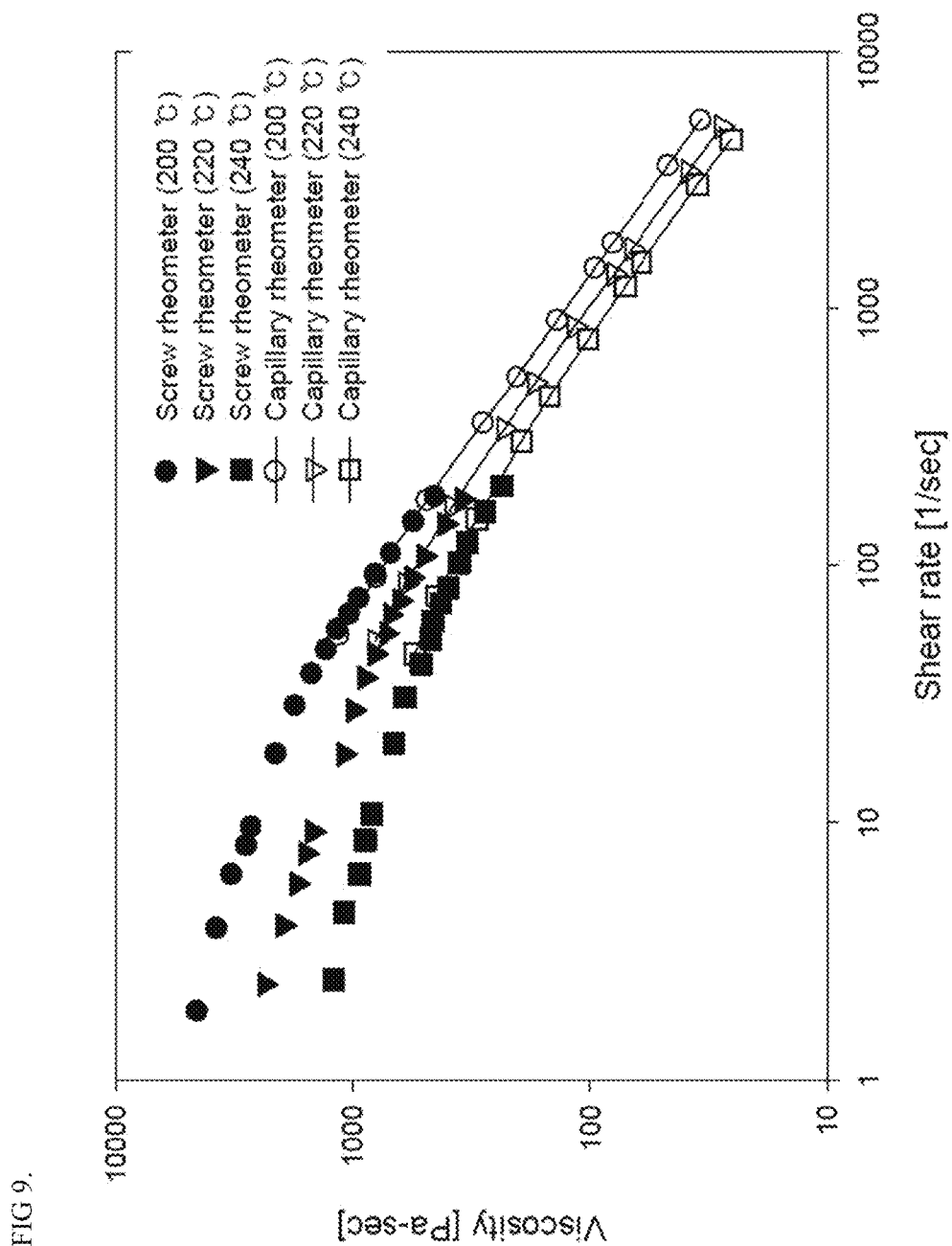
FIG. 9 is a graph showing a result of measuring rheological properties using a device for measuring rheological properties of a high-viscosity material according to Experimental Example 2.

As illustrated in FIGS. 8 and 9, from the graphs showing changes in viscosity according to shear rate of each material, it can be seen that a function graph to which the device for measuring rheological properties of a high-viscosity material which is the present invention (referred to as a screw rheometer for convenience of description) is applied and a function graph to which a capillary rheometer is applied were almost identically formed.

Figure 10:
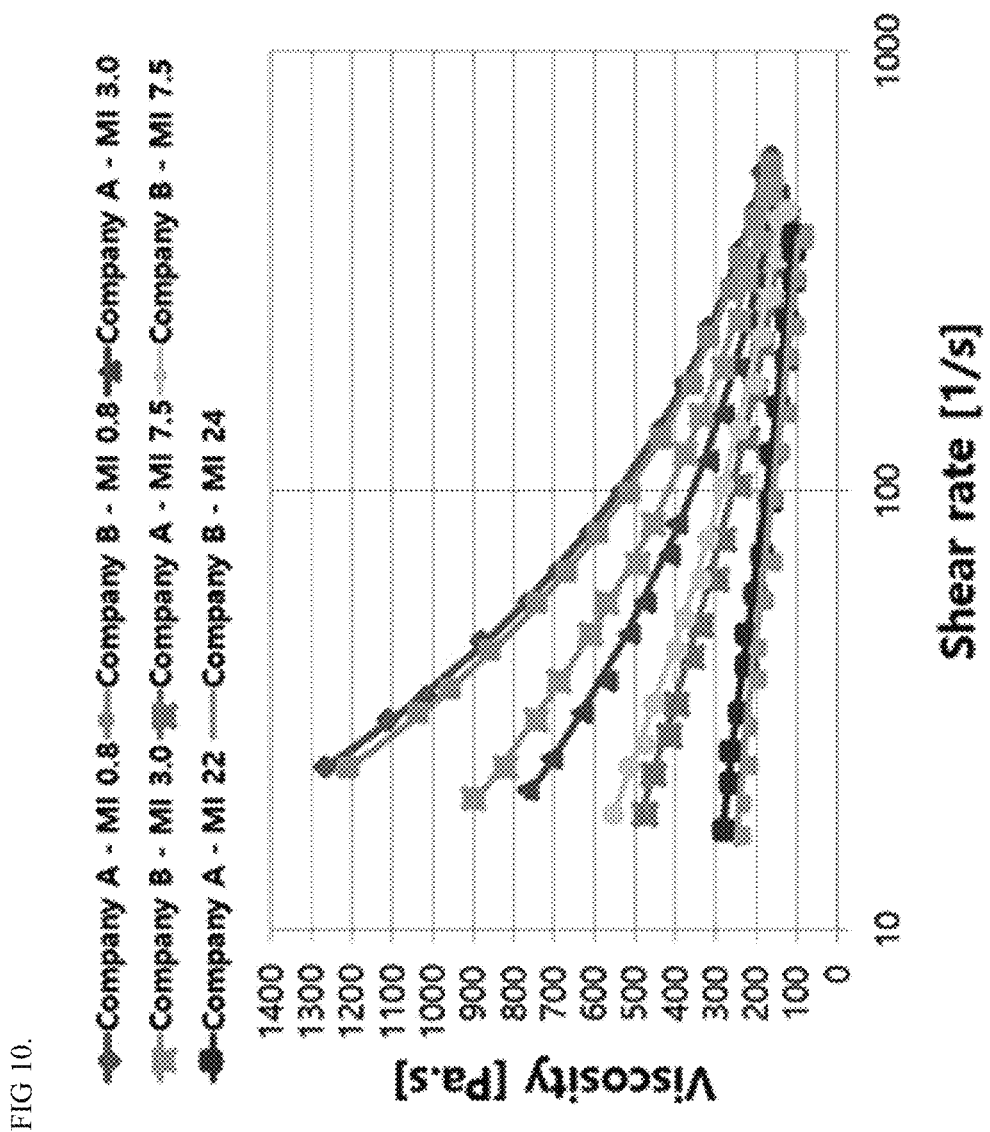
FIG. 10 is a graph showing a result of measuring rheological properties using a device for measuring rheological properties of a high-viscosity material according to Experimental Example 3.

Also, as illustrated in FIG. 10, by applying LDPE in various ways, the viscosity and shear rate of various materials were able to be promptly measured.

Figure 11:
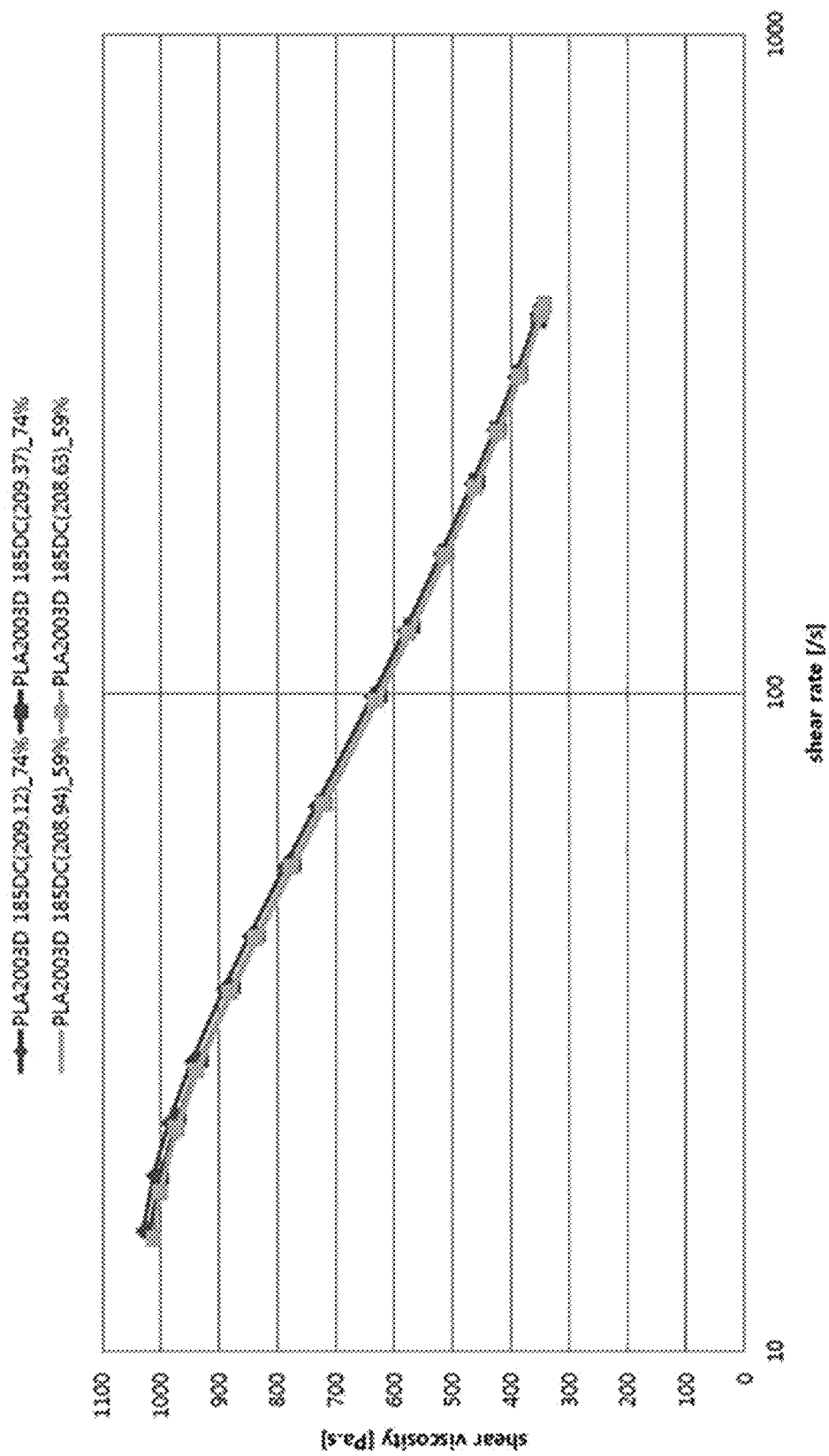
FIG. 11 is a graph showing a result of measuring rheological properties using a device for measuring rheological properties of a high-viscosity material according to Experimental Example 4.

Further, as illustrated in FIG. 11, it was found that, even when PLAs having different humidity levels are applied and viscosity values are calculated by conducting an experiment at the same temperature, the same graph is formed within an error range.

Accordingly, it was found that, since the viscosity value is an inherent characteristic of the material according to temperature, the viscosity value is hardly affected by humidity.

Figure 12:
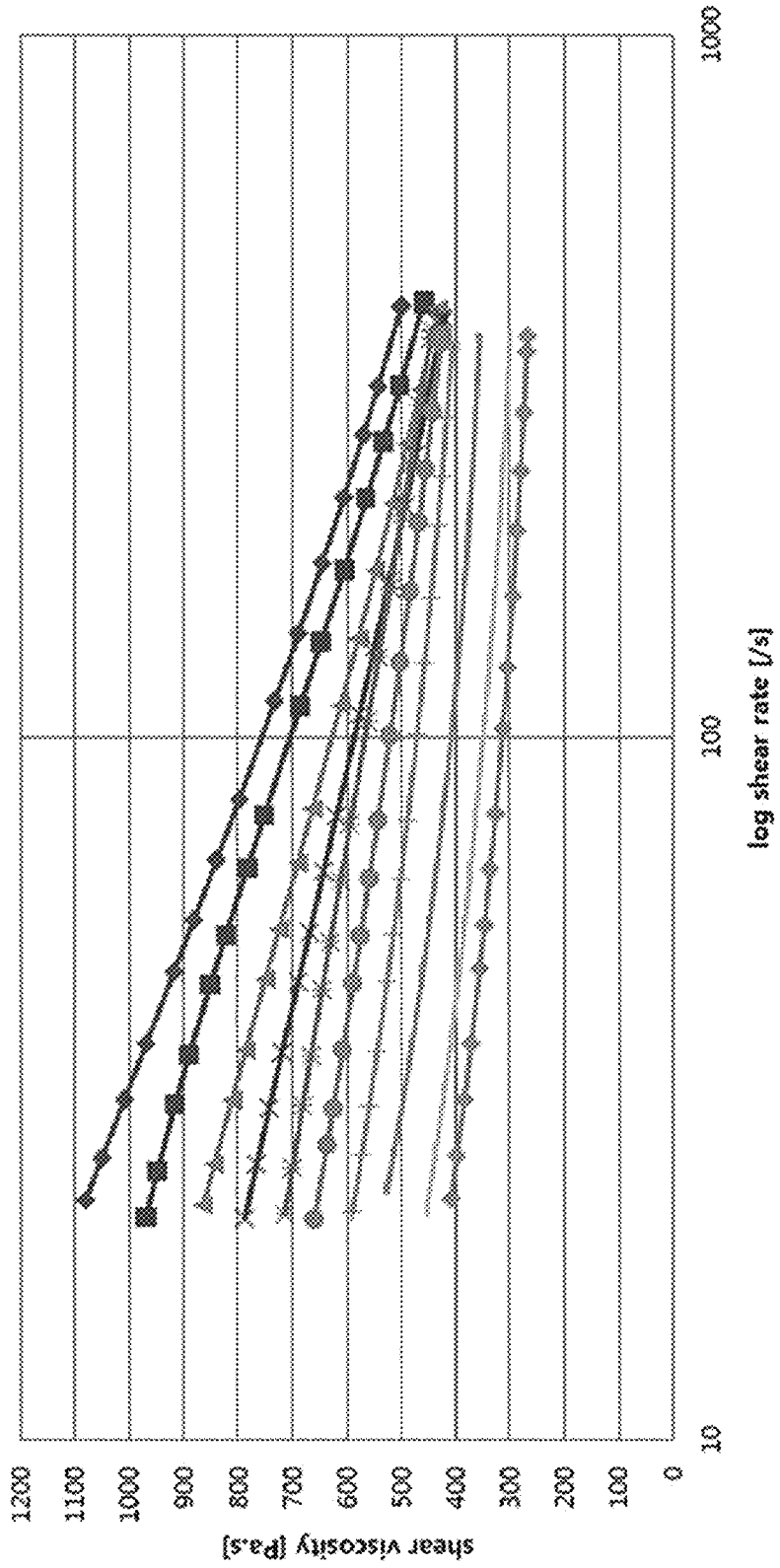
FIG. 12 is a graph showing a result of measuring rheological properties using a device for measuring rheological properties of a high-viscosity material according to Experimental Example 5.

Also, as illustrated in FIG. 12, by varying the temperature of polycarbonate (PC), it was possible to easily compare differences in viscosity and shear rate according to temperature.

Further, it can be seen that viscosity function graphs according to each material have the same shape within an error range.

Accordingly, it is considered that changes in viscosity according to shear rate of a material can be reproducibly measured using the device for measuring rheological properties of a high-viscosity material according to the present invention.

Figure 13:
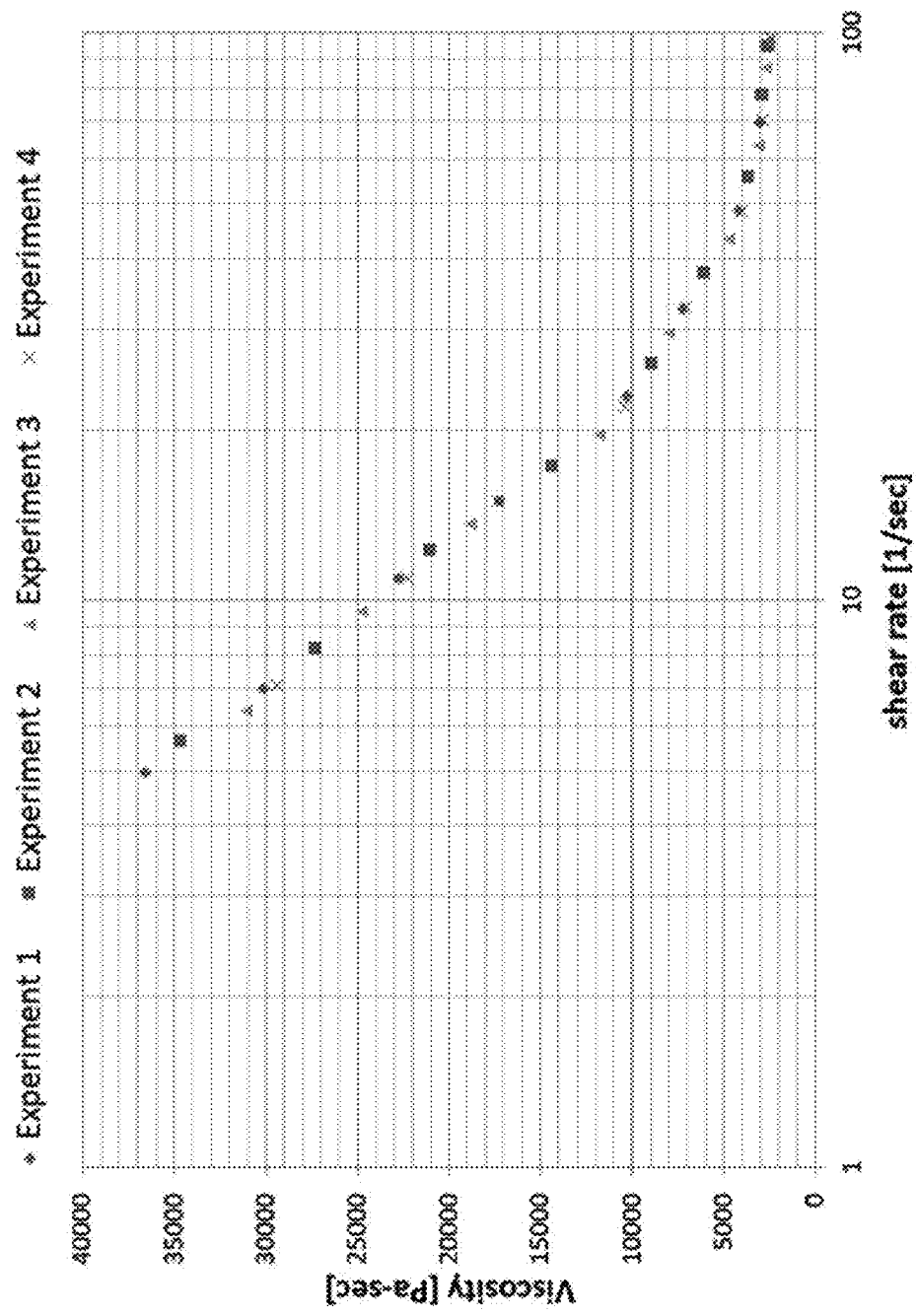
FIG. 13 is a graph showing a result of measuring rheological properties using a device for measuring rheological properties of a high-viscosity material according to Experimental Example 6.

Further, as illustrated in FIGS. 13 to 15, it was possible to easily measure the viscosity, shear rate, and relaxation time of rubber, whose viscosity is known to be difficult to measure.

Further, it can be seen that, due to controlling the rotational speed of each material, an error range was measured to be less than 2% and data reliability was improved.

In particular, as illustrated in FIG. 13, when the viscosity of rubber was measured four times, the measurement results were on the same line when the shear rate was slightly changed. From this, it is considered that reproducibility is high.

Also, as illustrated in FIG. 14, by measuring the viscosity and shear rate of the material and then measuring the relaxation time thereof, it was possible to measure the viscosity, shear rate, and relaxation time at one time.

Accordingly, it is considered that there is an advantage of being able to measure various characteristics of a material at one time using the device for measuring rheological properties of a high-viscosity material which is the present invention.

Further, as illustrated in FIG. 15, it was possible to easily measure stress behavior according to stress relaxation time.

Figure 16:
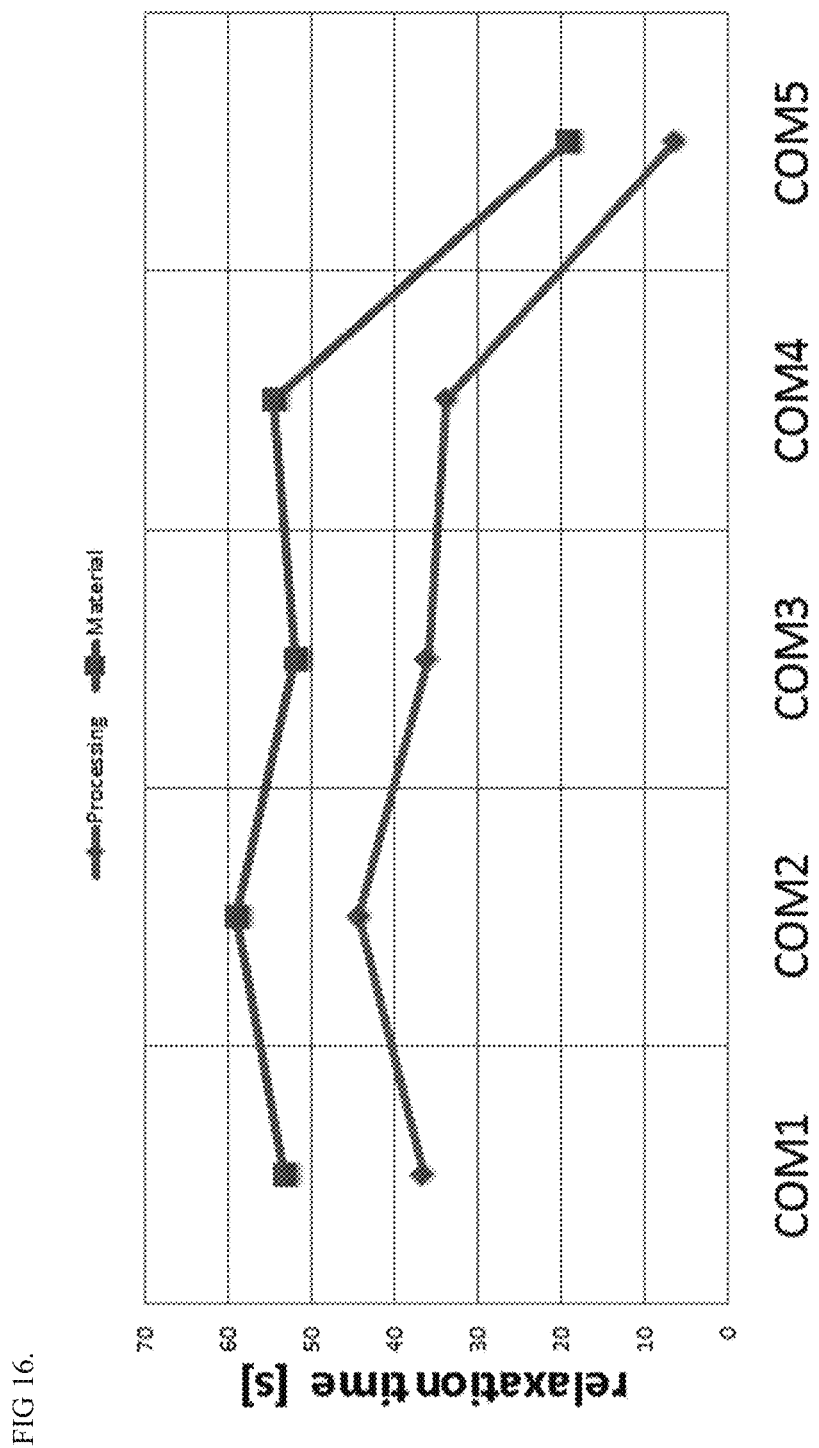
FIG. 16 is a graph showing a result of measuring rheological properties using a device for measuring rheological properties of a high-viscosity material according to Experimental Example 7.

Also, as illustrated in FIG. 16, when relaxation times of different materials were measured at a high shear rate and a low shear rate, differences in the relaxation times were not maintained to be constant according to the material.

Accordingly, it can be seen that the relaxation time is high when measured at a high shear rate and is low when measured at a low shear rate.

Further, while conventional rubber has a disadvantage in that it is difficult to calculate relaxation time due to the viscosity being measured to be constant according to changes in temperature, as illustrated in FIGS. 13 to 16, it can be seen that the relaxation time of rubber may be easily measured.

Figure 17:
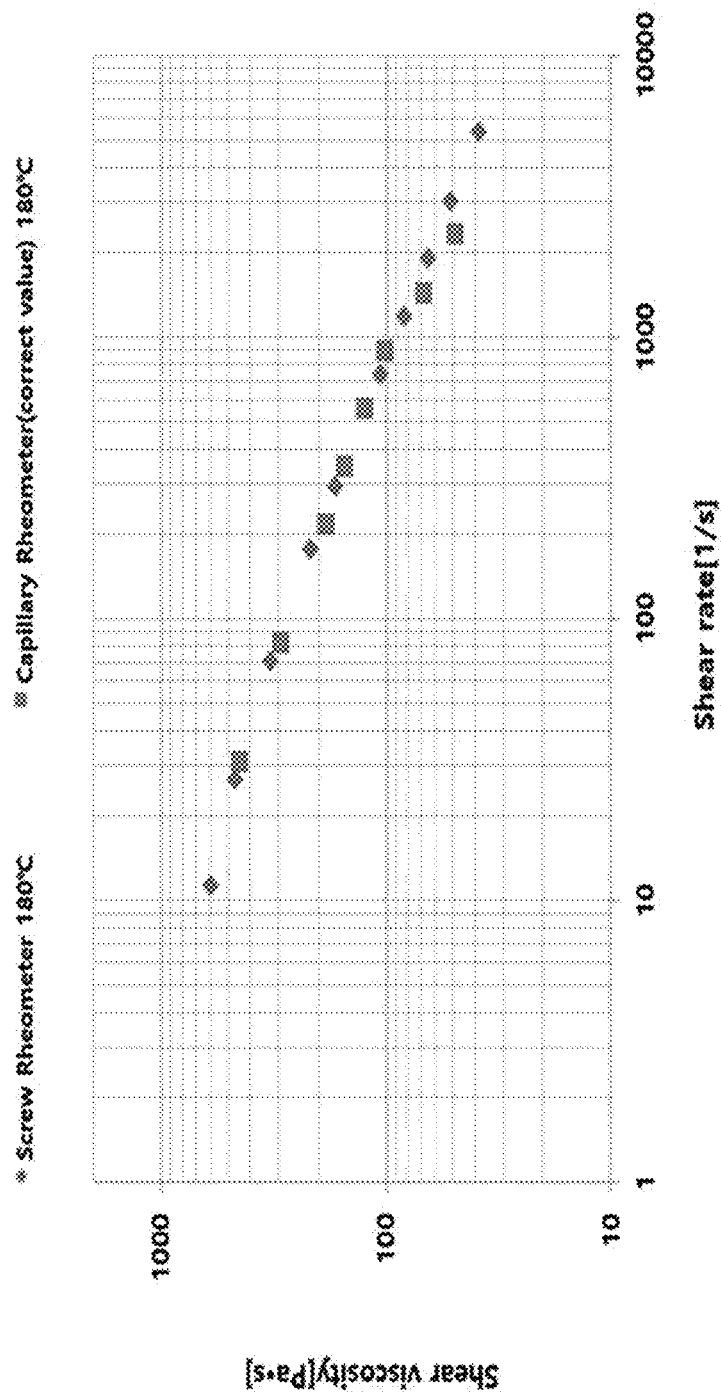
FIG. 17 is a graph showing a result of measuring rheological properties using a device for measuring rheological properties of a high-viscosity material according to Experimental Example 8.

Also, as illustrated in FIG. 17, when LDPE MFR10 on which Bagley correction and Rabinowitch correction are performed, which are known to allow the most accurate measurement when measuring viscosity or shear rate, was applied as LDPE MFR10, by applying the screw rheometer, which is the present invention, and the capillary rheometer to measure the shear rate according to viscosity, it was found that physical properties are easily measured as reliable values by the device for measuring rheological properties of a high-viscosity material which is the present invention.

INDUSTRIAL APPLICABILITY

The present invention relates to a device for measuring rheological properties of a high-viscosity material and a measurement method thereof and is capable of precisely and reproducibly measuring viscosity by measuring a change in pressure of the high-viscosity material. In this way, the present invention has industrial applicability.

The invention claimed is:

1. A device for measuring rheological properties of a high-viscosity material, the device comprising:
a first measurer (100) which includes one or more first screws (140) therein;
a second transmitter (200) which is formed to interwork with any one selected from the first measurer (100) and a first controller (300) and which is configured to measure a measurement value of a material included in the first measurer (100);
the first controller (300) which is formed to interwork with the first measurer (100) and configured to control rotation of the first screw (140); and
a second controller (400) which is formed to interwork with any one selected from the first measurer (100), the second transmitter (200), and the first controller (300) to control the same,
wherein the first measurer (100) includes a discharger (110) which is formed to facilitate measurement of physical properties of the high-viscosity material in the first measurer (100) and discharge of the high-viscosity material to the outside, a temperature maintainer (120) which is formed on any one selected from the outside and inside of the first measurer (100) to maintain the temperature inside the first measurer (100) to be constant, a first inlet (130) which is formed to have one open side to allow the material to be measured to enter the first measurer (100), and the first screw (140) which is inserted into the first measurer (100) to push the material included in the first measurer (100) toward the discharger (110) and to, simultaneously, protrude outward to control the temperature of the material according to the rotational speed and which includes one or more first blade portions (141) formed to surround an outer peripheral surface, and
the first measurer (100) includes one or more third blade portions (146) which are formed to protrude outward from an end of any one selected from one side and the other side of the first screw (140) so as not to interfere with the first blade portion (141) and which are formed to surround an outer diameter of the first screw (140),
wherein the second transmitter (200) includes a second measurer (210) formed to interwork with the first measurer (100), and
wherein the second measurer (210) is formed to have a size that is larger than or equal to the interval between the first blade portions (141) formed to protrude outward along an outer diameter of the first screw (140).

2. The device of claim 1, wherein the high-viscosity material included in the first measurer (100) has a viscosity of 50 cP or higher at a temperature at which the measurement is to be performed.

3. The device of claim 1, wherein Z, which is a length of an interval between the first blade portions (141), is formed to be a length that is less than or equal to $3D_B$ based on $D_B$ which is an inner diameter of the first measurer (100).

4. A device for measuring rheological properties of a high-viscosity material, the device comprising:
a first measurer (100) which includes one or more first screws (140) therein;
a second transmitter (200) which is formed to interwork with any one selected from the first measurer (100) and a first controller (300) and which is configured to measure a measurement value of a material included in the first measurer (100);
the first controller (300) which is formed to interwork with the first measurer (100) and configured to control rotation of the first screw (140); and
a second controller (400) which is formed to interwork with any one selected from the first measurer (100), the second transmitter (200), and the first controller (300) to control the same,
wherein the first measurer (100) includes a discharger (110) which is formed to facilitate measurement of physical properties of the high-viscosity material in the first measurer (100) and discharge of the high-viscosity material to the outside, a temperature maintainer (120) which is formed on any one selected from the outside and inside of the first measurer (100) to maintain the temperature inside the first measurer (100) to be constant, a first inlet (130) which is formed to have one open side to allow the material to be measured to enter the first measurer (100), and the first screw (140) which is inserted into the first measurer (100) to push the material included in the first measurer (100) toward the discharger (110) and to, simultaneously, protrude outward to control the temperature of the material according to the rotational speed and which includes one or more first blade portions (141) formed to surround an outer peripheral surface, and
the first measurer (100) includes one or more third blade portions (146) which are formed to protrude outward from an end of any one selected from one side and the other side of the first screw (140) so as not to interfere with the first blade portion (141) and which are formed to surround an outer diameter of the first screw (140),
wherein the first measurer (100) includes any one selected from a fourth screw (147-1), which is formed to have an outer diameter gradually decreasing toward an end and includes a fourth blade portion (148) formed to protrude outward to surround the outer diameter, and a fifth screw (147-2), which is formed to have an outer diameter gradually increasing toward an end and includes the first blade portion (141) formed to protrude outward to surround the outer diameter.

5. A device for measuring rheological properties of a high-viscosity material, the device comprising:
a first measurer (100) which includes one or more first screws (140) therein;
a second transmitter (200) which is formed to interwork with any one selected from the first measurer (100) and a first controller (300) and which is configured to measure a measurement value of a material included in the first measurer (100);
the first controller (300) which is formed to interwork with the first measurer (100) and configured to control rotation of the first screw (140); and
a second controller (400) which is formed to interwork with any one selected from the first measurer (100), the second transmitter (200), and the first controller (300) to control the same,
wherein the first measurer (100) includes a discharger (110) which is formed to facilitate measurement of physical properties of the high-viscosity material in the first measurer (100) and discharge of the high-viscosity material to the outside, a temperature maintainer (120) which is formed on any one selected from the outside and inside of the first measurer (100) to maintain the temperature inside the first measurer (100) to be constant, a first inlet (130) which is formed to have one open side to allow the material to be measured to enter the first measurer (100), and the first screw (140) which is inserted into the first measurer (100) to push the material included in the first measurer (100) toward the discharger (110) and to, simultaneously, protrude outward to control the temperature of the material according to the rotational speed and which includes one or more first blade portions (141) formed to surround an outer peripheral surface, and the first measurer (100) includes one or more third blade portions (146) which are formed to protrude outward from an end of any one selected from one side and the other side of the first screw (140) so as not to interfere with the first blade portion (141) and which are formed to surround an outer diameter of the first screw (140), wherein the first measurer (100) further includes a third measurer (149) formed to protrude in a longitudinal direction from an end of the first screw (140).

* * * * *